US012020401B2

(12) United States Patent
Martin et al.

(10) Patent No.: US 12,020,401 B2
(45) Date of Patent: Jun. 25, 2024

(54) DATA PROCESSING SYSTEMS

(71) Applicant: Arm Limited, Cambridge (GB)

(72) Inventors: Samuel Martin, Waterbeach (GB);
Metin Gokhan Unal, Gamston (GB);
Damian Piotr Modrzyk, Katowice (PL)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/675,644

(22) Filed: Nov. 6, 2019

(65) Prior Publication Data

US 2020/0143516 A1 May 7, 2020

(30) Foreign Application Priority Data

Nov. 7, 2018 (GB) ..................................... 1818163

(51) Int. Cl.
*G06T 3/4092* (2024.01)
*G06F 3/01* (2006.01)
(Continued)

(52) U.S. Cl.
CPC ............ *G06T 3/4092* (2013.01); *G06F 3/011* (2013.01); *G06F 3/012* (2013.01); *G06F 3/0346* (2013.01);
(Continued)

(58) Field of Classification Search
CPC ...... A61M 2230/005; A61M 2205/507; G02B 27/0172; G02B 27/017; G02B 27/0093;
(Continued)

(56) References Cited

U.S. PATENT DOCUMENTS 5,255,090 A 10/1993 Israelsen
5,321,776 A 6/1994 Shapiro
(Continued)

FOREIGN PATENT DOCUMENTS

CN 106464854 2/2017
GB 2553744 3/2018
(Continued)

OTHER PUBLICATIONS

GB Combined Search and Examination Report dated May 3, 2019, GB Patent Application No. GB1818163.6.
(Continued)

*Primary Examiner* — Xiao M Wu
*Assistant Examiner* — Scott E Sonners
(74) *Attorney, Agent, or Firm* — Vierra Magen Marcus LLP

(57) ABSTRACT

In a data processing system, when displaying a foveated image, a producer processing unit generates plural different resolution versions of the frame to be displayed. A display processor then generates a view orientation transformed output version of the frame to be displayed using data from the plural different resolution versions of the frame to be displayed generated by the producer processing unit based on data indicative of which resolution version of the frame is to be used for respective regions of the view orientation transformed output version of the frame to be displayed provided to the display processor.

19 Claims, 14 Drawing Sheets

(51) Int. Cl.
    *G06F 3/0346*     (2013.01)
    *G06T 3/60*     (2024.01)
    *G06T 19/00*     (2011.01)
    *H04N 13/117*     (2018.01)

(52) U.S. Cl.
    CPC .............. *G06T 3/60* (2013.01); *G06T 19/006*
    (2013.01); *H04N 13/117* (2018.05); *G06T 2210/36* (2013.01)

(58) Field of Classification Search
    CPC ...... G02B 2027/014; G02B 2027/0187; G02B 23/125; G02B 27/01; G02B 27/1066; G02B 2027/0116; G02B 21/008; G02B 21/367; G06T 19/006; G06T 3/4053; G06T 7/557; G06T 2207/10052; G06T 15/20; G06T 2200/04; G06T 2207/20024; G06T 2207/20092; G06T 3/4038; G06T 3/4092; G06T 2210/36; G06F 3/013; G06F 3/011; G06F 3/14; G06F 3/01; H04N 13/117; H04N 19/59; H04N 21/234345
    See application file for complete search history.

(56) References Cited

U.S. PATENT DOCUMENTS

| | | |
|---|---|---|
| 5,446,495 A | 8/1995 | Tourtier et al. |
| 5,488,687 A | 1/1996 | Rich |
| 6,100,897 A | 8/2000 | Mayer et al. |
| 6,115,480 A | 9/2000 | Washizawa |
| 6,144,773 A | 11/2000 | Kolarov et al. |
| 6,252,989 B1 | 6/2001 | Geisler et al. |
| 6,510,177 B1 | 1/2003 | De Bonet et al. |
| 6,549,666 B1 | 4/2003 | Schwartz |
| 6,631,240 B1 | 10/2003 | Salesin et al. |
| 6,778,709 B1 | 8/2004 | Taubman |
| 7,644,131 B2 | 1/2010 | Levanon et al. |
| 7,667,707 B1 | 2/2010 | Margulis |
| 8,542,939 B2 | 9/2013 | Nystad et al. |
| 8,558,834 B2 | 10/2013 | Lee |
| 8,611,652 B2 | 12/2013 | Jannard et al. |
| 8,988,443 B2 | 3/2015 | Croxford et al. |
| 9,014,496 B2 | 4/2015 | Nystad |
| 9,035,807 B2 | 5/2015 | Jiang et al. |
| 9,406,155 B2 | 8/2016 | Oterhals et al. |
| 9,640,131 B2 | 5/2017 | Croxford |
| 10,009,439 B1 | 6/2018 | Kolam |
| 10,096,100 B2 | 10/2018 | Naka |
| 10,178,147 B1 | 1/2019 | Kolam |
| 10,395,394 B2 | 8/2019 | Flordal et al. |
| 10,466,915 B2 | 11/2019 | Carter et al. |
| 10,475,370 B2 | 11/2019 | Spitzer et al. |
| 10,504,278 B1* | 12/2019 | Hornbeck ................ G06F 3/013 |
| 10,542,277 B2 | 1/2020 | Stolt et al. |
| 10,824,357 B2 | 11/2020 | Flordal et al. |
| 10,841,585 B2 | 11/2020 | Ihara et al. |
| 10,878,527 B2 | 12/2020 | Selvik et al. |
| 10,896,536 B2 | 1/2021 | Croxford et al. |
| 10,950,305 B1 | 3/2021 | Seiler |
| 11,009,944 B1 | 5/2021 | Choi et al. |
| 11,145,631 B1 | 10/2021 | Ouderkirk et al. |
| 2002/0057279 A1 | 5/2002 | Jouppi |
| 2003/0179409 A1 | 9/2003 | Nishida |
| 2004/0105000 A1 | 6/2004 | Yuri |
| 2004/0227703 A1 | 11/2004 | Lamvik et al. |
| 2005/0094901 A1 | 5/2005 | Seol et al. |
| 2005/0163398 A1 | 7/2005 | Ioka |
| 2007/0133904 A1 | 6/2007 | Hagiwara |
| 2007/0237410 A1 | 10/2007 | Cormode et al. |
| 2008/0152218 A1 | 6/2008 | Okada |
| 2009/0096645 A1 | 4/2009 | Yasuda et al. |
| 2009/0141048 A1 | 6/2009 | Fujimoto et al. |
| 2009/0160872 A1 | 6/2009 | Gibbons |
| 2010/0026737 A1 | 2/2010 | Ida et al. |
| 2010/0073574 A1 | 3/2010 | Nakajima et al. |
| 2010/0104208 A1 | 4/2010 | Murata |
| 2010/0156955 A1 | 6/2010 | Kimura |
| 2010/0188396 A1 | 7/2010 | Mejdrich et al. |
| 2010/0201719 A1 | 8/2010 | Kimura |
| 2011/0013854 A1 | 1/2011 | Odagiri |
| 2011/0043526 A1 | 2/2011 | Shiomi et al. |
| 2011/0249755 A1 | 10/2011 | Shibahara et al. |
| 2012/0032960 A1 | 2/2012 | Kameyama |
| 2012/0086850 A1 | 4/2012 | Irani et al. |
| 2013/0195352 A1 | 8/2013 | Nystad et al. |
| 2013/0235031 A1 | 9/2013 | Karras |
| 2013/0250144 A1 | 9/2013 | Takayama |
| 2013/0321423 A1 | 12/2013 | Rossato et al. |
| 2014/0185668 A1 | 7/2014 | Jiang et al. |
| 2014/0204107 A1 | 7/2014 | Laksono et al. |
| 2014/0267396 A1 | 9/2014 | Doolittle |
| 2014/0321738 A1 | 10/2014 | Shibata et al. |
| 2015/0123974 A1 | 5/2015 | Joo et al. |
| 2015/0160446 A1 | 6/2015 | Kalkbrenner et al. |
| 2015/0227376 A1 | 8/2015 | Engh-Halstvedt et al. |
| 2015/0248764 A1 | 9/2015 | Keskin et al. |
| 2016/0005344 A1 | 1/2016 | Stine et al. |
| 2016/0035069 A1 | 2/2016 | Min et al. |
| 2016/0038092 A1 | 2/2016 | Golay |
| 2016/0078600 A1 | 3/2016 | Perez Pellitero et al. |
| 2016/0180502 A1 | 6/2016 | Salvador Marcos |
| 2016/0227241 A1 | 8/2016 | Franche et al. |
| 2016/0284043 A1 | 9/2016 | Stoye et al. |
| 2016/0345018 A1 | 11/2016 | Sadhwani et al. |
| 2016/0379075 A1 | 12/2016 | Ando |
| 2016/0379606 A1 | 12/2016 | Kollin et al. |
| 2017/0048245 A1 | 2/2017 | Owen et al. |
| 2017/0061894 A1 | 3/2017 | Ikeda et al. |
| 2017/0134691 A1 | 5/2017 | Unno |
| 2017/0169543 A1 | 6/2017 | Saquib et al. |
| 2017/0178296 A1 | 6/2017 | Li et al. |
| 2017/0200308 A1 | 7/2017 | Nguyen et al. |
| 2017/0206632 A1 | 7/2017 | Milanfar et al. |
| 2017/0287447 A1 | 10/2017 | Barry |
| 2017/0316601 A1* | 11/2017 | Kakarlapudi ........... G06T 19/20 |
| 2017/0347107 A1 | 11/2017 | Teng et al. |
| 2017/0352165 A1 | 12/2017 | Flordal et al. |
| 2018/0004443 A1 | 1/2018 | Carter et al. |
| 2018/0033405 A1 | 2/2018 | Tall et al. |
| 2018/0107271 A1 | 4/2018 | Woo |
| 2018/0129419 A1 | 5/2018 | Flordal et al. |
| 2018/0136720 A1 | 5/2018 | Spitzer et al. |
| 2018/0137598 A1 | 5/2018 | Spitzer et al. |
| 2018/0137602 A1 | 5/2018 | Spitzer et al. |
| 2018/0165792 A1 | 6/2018 | Tavakoli et al. |
| 2018/0176535 A1* | 6/2018 | Ninan ..................... G06F 3/013 |
| 2018/0182114 A1 | 6/2018 | Hanamoto |
| 2018/0224935 A1 | 8/2018 | Thunström |
| 2018/0247132 A1 | 8/2018 | Liu et al. |
| 2018/0260719 A1 | 9/2018 | Nori et al. |
| 2018/0276873 A1 | 9/2018 | Croxford et al. |
| 2018/0284451 A1* | 10/2018 | Eash ...................... G06F 3/013 |
| 2018/0285481 A1 | 10/2018 | Czmyrid et al. |
| 2018/0288423 A1 | 10/2018 | Vembar |
| 2018/0301110 A1* | 10/2018 | Feng ...................... G09G 5/005 |
| 2018/0308266 A1 | 10/2018 | Surti et al. |
| 2018/0332312 A1 | 11/2018 | Liu et al. |
| 2018/0350036 A1 | 12/2018 | VanReenen et al. |
| 2018/0352207 A1 | 12/2018 | Kern, II et al. |
| 2018/0357752 A1 | 12/2018 | Ho et al. |
| 2019/0005630 A1 | 1/2019 | Li et al. |
| 2019/0005924 A1 | 1/2019 | Saeed et al. |
| 2019/0019315 A1* | 1/2019 | Bastani .................. H04N 19/174 |
| 2019/0026874 A1* | 1/2019 | Jin ........................ G02B 27/017 |
| 2019/0043162 A1 | 2/2019 | Saito |
| 2019/0114829 A1 | 4/2019 | Abello Rosello et al. |
| 2019/0122642 A1 | 4/2019 | Morein |
| 2019/0130630 A1 | 5/2019 | Ackerson et al. |
| 2019/0139267 A1 | 5/2019 | Mokrushin |
| 2019/0141334 A1 | 5/2019 | Lim et al. |
| 2019/0180672 A1 | 6/2019 | Knez et al. |
| 2019/0206369 A1 | 7/2019 | Kempf et al. |

(56) References Cited

U.S. PATENT DOCUMENTS

| | | |
|---|---|---|
| 2019/0221185 A1 | 7/2019 | Grossman et al. |
| 2019/0222842 A1 | 7/2019 | Zhang et al. |
| 2019/0318709 A1 | 10/2019 | Wicks et al. |
| 2019/0347757 A1 | 11/2019 | Selvik et al. |
| 2019/0347792 A1 | 11/2019 | Pauly et al. |
| 2019/0362691 A1 | 11/2019 | Lamkin et al. |
| 2019/0364277 A1 | 11/2019 | Lamkin et al. |
| 2019/0371253 A1 | 12/2019 | Morein |
| 2019/0391641 A1 | 12/2019 | VanReenen et al. |
| 2020/0027388 A1 | 1/2020 | Iwaki et al. |
| 2020/0029071 A1 | 1/2020 | Kang et al. |
| 2020/0045321 A1 | 2/2020 | Thirumalai et al. |
| 2020/0051213 A1 | 2/2020 | Nallam |
| 2020/0051214 A1 | 2/2020 | Nallam |
| 2020/0058263 A1 | 2/2020 | McKeever et al. |
| 2020/0065435 A1 | 2/2020 | Czmyrid et al. |
| 2020/0066024 A1 | 2/2020 | Tavakoli et al. |
| 2020/0066234 A1 | 2/2020 | Wang |
| 2020/0082791 A1 | 3/2020 | Petrie |
| 2020/0082794 A1 | 3/2020 | Sanders et al. |
| 2020/0090396 A1 | 3/2020 | Holmes et al. |
| 2020/0104708 A1 | 4/2020 | Motoki |
| 2020/0105171 A1 | 4/2020 | Greenebaum et al. |
| 2020/0152105 A1 | 5/2020 | Ishii |
| 2020/0167999 A1 | 5/2020 | Schmit et al. |
| 2020/0184933 A1 | 6/2020 | Nijs et al. |
| 2020/0288134 A1 | 9/2020 | Lim et al. |
| 2020/0311945 A1 | 10/2020 | Lim |
| 2020/0322616 A1 | 10/2020 | Sakomizu |
| 2021/0004932 A1 | 1/2021 | Newman et al. |
| 2021/0011646 A1 | 1/2021 | Nystad et al. |
| 2021/0042550 A1 | 2/2021 | Nagato et al. |
| 2021/0063741 A1 | 3/2021 | Riguer et al. |
| 2021/0065437 A1 | 3/2021 | Brkic et al. |
| 2021/0067791 A1 | 3/2021 | Ye et al. |
| 2021/0084219 A1 | 3/2021 | Ito et al. |
| 2021/0097642 A1 | 4/2021 | Selvik et al. |
| 2021/0104014 A1 | 4/2021 | Kolb, V et al. |
| 2021/0110514 A1 | 4/2021 | Anger et al. |
| 2021/0120261 A1 | 4/2021 | Lim et al. |
| 2021/0136364 A1 | 5/2021 | Ko et al. |
| 2021/0136416 A1 | 5/2021 | Kim et al. |
| 2021/0168377 A1 | 6/2021 | Sarwer et al. |
| 2021/0174768 A1 | 6/2021 | Jarvenpaa et al. |
| 2021/0176479 A1 | 6/2021 | Liao et al. |
| 2021/0210054 A1 | 7/2021 | Baijal |
| 2021/0210177 A1 | 7/2021 | Lee et al. |
| 2021/0227221 A1 | 7/2021 | Lim et al. |
| 2021/0227222 A1 | 7/2021 | Lee et al. |
| 2021/0235072 A1 | 7/2021 | Ko et al. |
| 2021/0279916 A1 | 9/2021 | Simon et al. |
| 2021/0287633 A1 | 9/2021 | Rai Kurlethimar et al. |
| 2022/0068243 A1 | 3/2022 | Croxford et al. |

FOREIGN PATENT DOCUMENTS

| | | |
|---|---|---|
| GB | 2573543 | 11/2019 |
| GB | 2575097 | 1/2020 |
| WO | 98/33315 | 7/1998 |
| WO | 01/03070 | 1/2001 |
| WO | 2015/128634 | 9/2015 |

OTHER PUBLICATIONS

Non-Final Office Action dated Apr. 14, 2021, U.S. Appl. No. 16/739,631.

GB Search Report dated Aug. 2, 2019, GB Patent Application No. GB1901900.9.

Martin, "Data Processing Systems," U.S. Appl. No. 16/739,631, filed Jan. 10, 2020.

Response to Non-Final Office Action dated Jul. 14, 2021, U.S. Appl. No. 16/739,631.

Final Office Action dated Aug. 9, 2021, U.S. Appl. No. 16/739,631.

Response to Final Office Action dated Feb. 9, 2022, U.S. Appl. No. 16/739,631.

Non-Final Office Action dated Mar. 25, 2022, U.S. Appl. No. 16/739,631.

Response to Non-Office Action dated Jul. 11, 2022, U.S. Appl. No. 16/739,631.

Notice of Allowance dated Oct. 24, 2022, U.S. Appl. No. 16/739,631.

Office Action dated Dec. 19, 2023, Chinese Patent Application No. 201911081435.2.

* cited by examiner

DATA PROCESSING SYSTEMS

BACKGROUND

The technology described herein relates to data processing systems, and in particular to the operation of data processing systems that display images on a display.

FIG. 1 shows an exemplary data processing system 14 comprising a host processor comprising a central processing unit (CPU) 7, a graphics processing unit (GPU) 2, a video codec 1, an image signal processor (ISP) 13 (that is, e.g., in communication with a camera 12), a display processor (display processing unit (DPU)) 5, and a memory controller 8. As shown in FIG. 1 these units communicate via an interconnect 9 and have access to off-chip memory 3.

In this system the GPU 2, video codec 1, ISP 13 and/or CPU 7 will generate frames (images) to be displayed and the display processor 5 will then provide the frames to a display 4 for display. The display 4 may be local or remote to the remainder of the system, and may have a wired or wireless connection to the display processor 5.

In use of this system, an application such as game executing on the host processor (CPU) will, for example, require the display of frames on the display 4. To do this, the application 10 will submit appropriate commands and data to a driver 11 for the graphics processing unit 2 that is executing on the CPU 7. The driver 11 will then generate appropriate commands and data to cause the graphics processing unit 2 to render appropriate frames for display and to store those frames in appropriate frame buffers, e.g. in the main memory 3. The display processor 5 will then read those frames into a buffer for the display from where they are then read out and displayed on the display panel of the display 4.

The frames for display may also or instead be streamed to the display processor from the processing unit, e.g. the GPU 2 or ISP 13, that is producing the frames, e.g. through a cache, if desired.

An example of a use of a data processing system 14 such as that illustrated in FIG. 1 is to provide a so-called "XR" display, such as an augmented reality (AR) and/or virtual reality (VR), head-mounted display (HMD) system. (In this case, the display 4 will be a head-mounted display of some kind.)

In a head-mounted AR/VR display operation, the appropriate images to be displayed to each eye will, e.g., be rendered by the graphics processing unit 2, in response to appropriate commands and data from the application, such as a game, (e.g. executing on the CPU 7) that requires the augmented reality or virtual reality display. The GPU 2 will, for example, render the images to be displayed at a rate that matches the refresh rate of the display, such as 60 frames per second.

In such arrangements, the system will also operate to track the movement of the head/gaze of the user (so-called head pose tracking). This head orientation (pose) data is then used to determine how the images should actually be displayed to the user for their current head position (view direction), and the images (frames) are rendered accordingly (for example by setting the camera (view point) orientation based on the head orientation data), so that an appropriate image based on the user's current direction of view can be displayed.

While it would be possible simply to determine the head orientation (pose) at the start of rendering a frame to be displayed in an AR/VR system, because of latencies in the rendering process, it can be the case that the user's head orientation (pose) has changed between the head orientation (pose) at the beginning of the rendering of the frame and the time when the frame is actually displayed (scanned out to the display panel).

To allow for this, frames to be displayed are rendered based on the head orientation data sensed at the beginning of the rendering of the frames, but then before the frames are actually displayed, the frames are re-projected based on an expected head orientation for the time that the frames will actually be displayed to the user. The expected head orientation may be, e.g., based on predicted head movements of the user between the time the frame is rendered and when it will actually be displayed. The re-projected version of the frame is then displayed. This allows the image displayed on the display to more closely match the user's (predicted) current head orientation.

To do this processing, the initial "application" frames are rendered into appropriate buffers in the memory but there is then a second rendering process that takes the initial, application frames in memory and uses the predicted head orientation (pose) information to render "re-projected" versions of the initially rendered frames that take account of the expected head orientation to provide the frames that will be displayed to the user. This typically involves some form of transformation on the frames, based on the predicted head orientation (pose). The so-transformed (re-projected) rendered frames are then displayed.

A further technique that is used to help facilitate the generation of frames for display at an appropriate rate in "XR" display systems is so-called "foveated" or "variable resolution" rendering.

Variable resolution ("foveated") rendering is a rendering technique where one or more parts of a frame (image) to be displayed are rendered at a higher resolution, but one or more other parts of the frame are rendered at a lower resolution.

This is based on the fact that the area of the frame that the user is looking at directly may need to be rendered at a higher resolution for visual acceptability, while the peripheral area of the frame that the user is not directly looking at can be rendered at a lower resolution whilst still appearing visually acceptable. This can then be used to reduce the rendering burden on the, e.g. graphics processing unit (GPU), that is producing the frames for display, by rendering the peripheral area at a lower resolution, rather than rendering the entire frame being displayed at the highest required ("foveal") resolution.

Variable resolution rendering may be carried out by identifying one or more "fixation points" where higher resolution areas of the frame will be rendered, with the areas further away from the fixation point(s) being rendered with a lower resolution. Thus, each fixation point may indicate the highest resolution area of the frame and, in some cases, is intended to correspond to the centre of the eye's retina (the fovea).

Variable resolution rendering can also be used to take account of (and exploit) lens distortions introduced by head-mounted displays (HMDs)). High resolution head-mounted displays, e.g. for virtual reality applications, typically use lenses that feature severe pin-cushion distortion. This pin-cushion distortion can be corrected by passing the rendered image through a barrel distortion. The effect of this is that the rendered image towards the centre of the display (for each eye) is magnified whereas the peripheral area is minified. The effect of this then is that the peripheral area can be rendered at a lower quality than the central, magnified area, without any significant loss in the overall visual effect for the user.

When performing variable resolution rendering, the locations of the highest resolution areas of the frame (e.g. the fixation point(s)) may be determined in any suitable and desired manner. For example, some form of head tracking or eye tracking (head pose tracking) may be used to try to identify where the user is looking at the image, so as to identify the area of the frame that should be rendered with the highest resolution. The location of higher resolution areas of the frame may also or instead be based on other factors, such as lens distortion.

The Applicants believe that there is scope for improved arrangements for displaying images, particularly in head-mounted display systems, such as for augmented and/or virtual reality applications.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
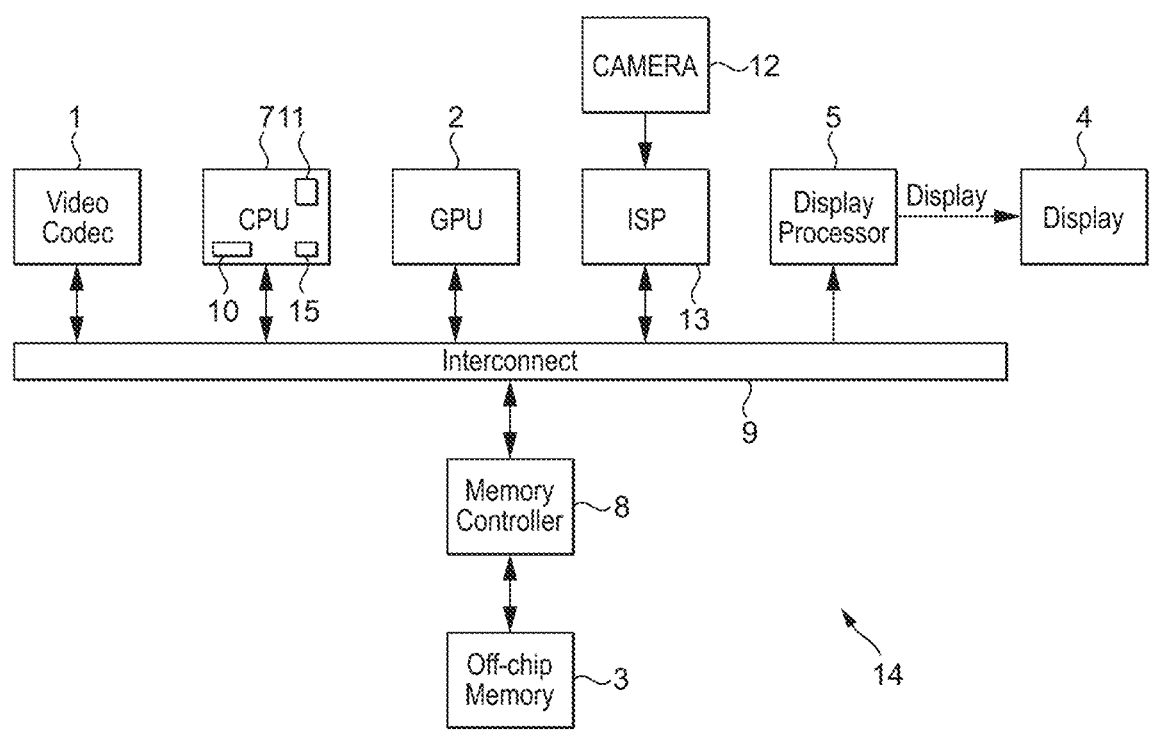
FIG. 1 shows an exemplary data processing system.

An embodiment of the technology described herein comprises a method of operating a data processing system, the data processing system comprising:
a display operable to display frames for display;
a producer processing unit operable to generate frames for display on the display; and
a display processor operable to provide frames generated by the producer processing unit to the display for display, the display processor comprising:
an input stage operable to read data of input frames;
an output stage operable to provide frames for display to the display; and
at least one transformation stage operable to:
generate a view orientation transformed output frame using data of an input frame read by the input stage;
the method comprising:
the producer processing unit generating, for a frame to be displayed, plural different resolution versions of the frame to be displayed;
providing to the display processor data indicative of which resolution version of the frame generated by the producer processing unit is to be used for respective regions of a view orientation transformed output version of the frame to be generated by the display processor for display;
the input stage of the display processor reading data of some or all of the plural different resolution versions of the frame to be displayed generated by the producer processing unit;
the display processor generating a view orientation transformed output version of the frame to be displayed using data from the plural different resolution versions of the frame to be displayed generated by the producer processing unit read by the input stage based on the data indicative of which resolution version of the frame generated by the producer processing unit is to be used for respective regions of the view orientation transformed output version of the frame to be displayed; and
the output stage of the display processor providing the view orientation transformed output version of the frame to the display for display.

Another embodiment of the technology described herein comprises a data processing system comprising:
a display operable to display frames for display;
a producer processing unit operable to generate frames for display on the display; and
a display processor operable to provide frames generated by the producer processing unit to the display for display, the display processor comprising:
an input stage operable to read data of input frames;
an output stage operable to provide frames for display to the display; and
at least one transformation stage operable to:
generate a view orientation transformed output frame using data of an input frame read by the input stage;
wherein:
the producer processing unit is configured to generate, for a frame to be displayed, plural different resolution versions of the frame to be displayed;
the input stage of the display processor is configured to read data of some or all of the plural different resolution versions of the frame to be displayed generated by the producer processing unit;
the display processor is configured to generate a view orientation transformed output version of a frame to be displayed using data from plural different resolution versions of the frame to be displayed generated by the producer processing unit read by the input stage based on data indicative of which resolution version of the frame generated by the producer processing unit is to be used for respective regions of a view orientation transformed output version of the frame to be displayed to be generated by the display processor for display provided to the display processor;

and the output stage of the display processor is configured to provide the view orientation transformed output version of the frame to the display for display.

The technology described herein relates to the operation of a data processing system when performing foveated (variable resolution) rendering.

In the technology described herein, a producer processing unit, such as a graphics processor, generates plural different resolution versions of a frame to be displayed. Those plural different resolution versions are then read by a display processor and used to generate a view orientation transformed version of the frame for display. The display processor is also provided with data indicative of which resolution version of the frame generated by the producer processing unit is to be used for respective regions of the view orientation transformed output version of the frame that is to be displayed and uses that data to determine which of the different resolution versions of the frame generated by the producer processing unit should be used when generating respective regions of the view orientation transformed output version of the frame.

As will be discussed further below, this facilitates providing foveated (variable resolution) frames for display for use, for example, in augmented or virtual reality display systems, in a more efficient and effective manner, and so can provide, for example, savings in terms of memory bandwidth, processing resources, power usage, etc.

The producer processing unit that generates the frames for displaying on the display can comprise any processing unit of data processing system that is capable of generating frames for display. Thus it may comprise, for example, a graphics processor (graphics processing unit (GPU)), a video processor/codec (video processing unit (VPU)), a CPU, and/or an image signal processor (ISP), etc. There may be more than one producer processing unit operable to generate frames for display on the display, if desired. In an embodiment, the producer processing unit is a graphics processor.

The frames that are generated for display can be any suitable and desired frames that it may be desirable to display. In an embodiment, the frames are frames that are generated for display for an application, such as a game, and in an embodiment for an augmented reality or virtual reality application. Each frame accordingly in an embodiment comprises an image to be displayed.

Each frame will comprise an array of data elements (sampling positions) (e.g. pixels), for each of which appropriate data (e.g. a set of colour values) is stored.

In an embodiment, the frames generated by the producer processing unit are stored, e.g. in a frame buffer, in memory, from where they are then read by the display processor for processing by the display processor (and then providing to the display for display).

The memory where the frames are stored (prior to processing by the display processor) may comprise any suitable memory and may be configured in any suitable and desired manner. For example, it may be a memory that is on-chip with the display processor, or it may be an external memory. In an embodiment it is in external memory, such as a main memory of the overall data processing system. It may be dedicated memory for this purpose, or it may be part of a memory that is used for other data as well.

In the technology described herein, the producer processing unit, e.g. GPU, generates a set of plural different resolution versions of a frame (and of each frame) to be displayed. The plural different resolution versions that are generated can be any suitable set of versions of the frame that can be used for foveated rendering (i.e. a set of images comprising views of the scene that the frame is to depict that are from the same viewpoint (views having (from) the same view position and having (in) the same view direction) but that have different resolutions).

There will be a highest resolution version of the frame in the set of plural different resolution frame versions (images) which will accordingly comprise the "foveal" view that is to be displayed at the fixation position where the highest resolution of the frame is to be displayed. There will then be one or more lower resolution versions of the frame which may be, and are in an embodiment, used and displayed away from the fixation point, e.g. towards the periphery of the output frame that is being displayed.

There could be just two different resolution frame versions, the highest resolution version and a lower resolution version. Alternatively, three or more different resolution versions for a frame could be prepared, comprising a highest resolution version and two or more lower resolution versions of the frame.

The different resolution versions of a frame are in an embodiment related to each other by a given, particular, and in an embodiment selected, scaling factor. Where there are more than two resolution versions, then the versions of each respective pair of "adjacent" resolution versions may be (and in one embodiment are) related to each other by the same scale factor (i.e. a constant scale factor between the different resolution versions is used). In some cases, such as virtual reality head-mounted displays, the lowest resolution version might be more spaced in resolution than the other versions (i.e. such that some immediate level resolution versions may, e.g., in effect, be absent).

The scale factor is in an embodiment a power of two, although other arrangements could be used, if desired. In one embodiment, a higher resolution version is twice the resolution of its immediately preceding lower resolution version (in the resolution hierarchy), i.e. the resolution of each version is related to its neighbouring version or versions in the resolution hierarchy by a factor of 2 (or by a factor of a half, accordingly).

In an embodiment, the producer processing unit is configured to provide a (and each) frame in the form of (as a set of) mipmaps.

While it would be possible simply to generate each different resolution version for the frame in its entirety (and in one embodiment that is what is done), in an embodiment, the different resolution versions of a frame are generated only for given, particular, and in an embodiment, selected regions (areas) of the overall output frame. In other words, the generating of the respective different resolution versions of the frame in an embodiment comprises generating for at least one (and in an embodiment for all) of those respective versions, some but not all of the complete frame (area of the frame).

For example, and in an embodiment, the highest resolution version is in an embodiment at least (and in an embodiment only) generated for the part (region) of the frame where that highest (full) resolution image may need to be displayed (i.e. for a region or regions that are centred around the fixation point or points, e.g. at the centre of the frame). Thus, the highest resolution version of a frame is in an embodiment generated for only some but not all of the (area of the) (overall) frame to be displayed.

Correspondingly, the lower resolution version or versions of a frame are in an embodiment generated at least for those frame regions that are further from the fixation point or points (e.g. from the centre of the frame), but may not be, and in an embodiment aren't, generated for those frame regions that are at or near the fixation point or points (e.g. that are at or near the centre of the frame).

Where the different resolution versions of the frame are only generated for some but not all of the overall frame, then the different resolution regions could be arranged so as to not overlap (in their coverage of the frame) at all (and in one embodiment this is the case) or such that they overlap at least to some extent (and in another embodiment, this is the case). In the latter case, the extent of overlap could be, e.g., and is in an embodiment, based on the size of the filter window (kernel) that is to be used when sampling from the different resolution versions of the frame when generating an output frame.

Once the different resolution versions of a frame have been prepared (and stored in the memory), those different resolutions of the frame are then provided to and processed by the display processor to provide a view orientation transformed output frame for display.

The number of different resolution versions of a frame that are processed by the display processor and combined to provide the output frame for display can be selected as desired. In one embodiment two (and only two) different resolution versions of the frame are combined to provide the view orientation transformed output frame. In other embodiments, more than two different resolution versions of the frame are combined.

As well as the different resolution versions of the frame to be displayed, the display processor is provided with data indicating which of the different resolution versions (e.g., mipmap level) of the frame produced by the producer processing unit should be used for respective regions (areas) of the overall output frame, with the display processor (as will be discussed further below, e.g., and in an embodiment, a transformation stage and/or composition stage of the display processor) then using that data to determine which of the different resolution versions of the frame generated by the producer processing unit to use for which regions of the transformed output frame.

The display processor will accordingly combine the plural different resolution versions of the frame generated by the producer processing unit in accordance with the data indicating which of the different resolution versions of the frame produced by the producer processing unit should be used for respective regions (areas) of the overall output frame to provide the view orientation transformed output frame.

Thus, the data indicating the different resolution versions of the frame to use should, and in an embodiment do, indicate how the different resolution versions of the frame should be combined, and thus in an embodiment indicates that the highest resolution version of the input frame should be used at (and around) the foveal fixation point or points, but a lower resolution version or versions should be used away from the fixation point or points (e.g. towards the periphery of the output frame).

The determination of which resolution version of the frame is to be used for any given position in the overall output frame can be performed as desired.

For example, appropriate head tracking or eye tracking information could be used to identify which resolution version should be displayed where in the output frame, and/or information relating to the properties of the display system could be used as well or instead. For example, in the case of head-mounted displays, the centre of the output frame could be identified and indicated as the region where the highest resolution version should be displayed, with regions towards the periphery of the output frame then being displayed at lower resolutions.

In one embodiment only a single one of the different resolution versions of the frame (e.g. the highest resolution version or a lower resolution version) is selected and indicated to be used at any given position (region) in the output frame that is to be displayed. However, in another embodiment, plural different resolution versions can be (and are) combined for at least some output frame regions.

The different regions that the output frame is divided into and for which an indication of which different resolution version of the frame should be used for that region can comprise any suitable and desired subdivision of the output frame into a plurality of regions. The regions are in an embodiment all the same size and configuration, and in an embodiment rectangular, and in an embodiment square. Each region could correspond to a single data element (pixel) in the output frame, but in an embodiment, each region corresponds to a, in an embodiment rectangular, and in an embodiment square, block of plural data elements (pixels) in the output frame.

The data indicating the different resolution versions of the frame to use can take any suitable and desired form, and can indicate the different resolution versions to be used in any suitable and desired manner.

In one embodiment this data is in the form of a two-dimensional array representing the (area of the) output frame to be displayed, with respective data element positions within the array then indicating which resolution version of the frame to use for that region within the output frame. Such an array could be, for example, in the form of a 2D texture, or "density map", describing which resolution version of the frame (e.g. mipmap level) to use for respective regions of the output frame.

In such a case, the "density map" may indicate the resolution to use for respective regions at any desired level of granularity (resolution) (sub-division into regions) across the area of the output frame. Thus each "density map" data element in an embodiment corresponds to a region comprising a given block of plural data elements (pixels) in the output frame to be generated.

In an embodiment the two dimensional array (density texture/map) is of a particular size, such as 64×64, 100×100, 128×128 or 256×256 data element positions, with each data element position in the array then mapping to a corresponding region (block) of the area of the output frame.

In these arrangements, the resolution version (e.g. mipmap level) to use for a given region of the output frame can be indicated in any suitable and desired manner. For example, the data could indicate a single one of the different resolution versions to use for a (and each) frame region (e.g. using integer values), or the versions to use could be indicated as fractional values or as a gradient (which can then be converted to a fractional value) (with a non-integer fractional value (level) indicating that two different resolution levels should be combined for that output frame region). Other arrangements would, of course, be possible.

The data indicating the different resolution versions of the frame to use could also or instead be provided in other forms, for example by means of a lookup table, or by some form of functional representation, or in the form of a bounding box (e.g. a 2D axis-aligned bounding box) that defines the area region(s) where the highest resolution version (level) should be used (with all other regions then being generated from a or the lower resolution (level) version of the frame) (and in one embodiment this is the case). The latter arrangement may be particularly applicable where only two different resolution versions of a frame are generated and used.

The resolution level indicating data (e.g. density map/texture) could be provided to the display processor in a compressed and/or lower resolution form, with the display processor first decompressing/upscaling or otherwise converting that data (e.g. density map) to a form suitable for use by the display processor before then using that information to determine which different resolution levels to use.

In another embodiment, the data indicating the different resolution versions of the frame to be used for respective regions (areas) of the view orientation transformed output frame is provided with (as part of) the different resolution versions of the frame themselves, for example, and in an embodiment, in the form "blending" parameter values, such as, and in an embodiment, transparency (alpha) values, that are associated with the different resolution versions of the frame. The display processor can then use the, e.g. transparency (alpha), values to composite (blend) the different resolution versions of the frame in the desired manner.

The determination of which resolution version to use where when generating the output frame and the generation of the data indicating that can be done by any suitable and desired component or processor of the data processing system. For example, the determination of which resolution version to use where for the output frame and the generation of the data, such as the density map/texture, indicating that, could be and is in an embodiment, done by the application that is requiring the display of the frames, e.g. based on one or more of, and in an embodiment both of: the properties of the lens system through which the frames (images) will be displayed; and user head tracking and/or eye tracking information (as discussed above).

Two sets of data, e.g. one based on the display (lens) system, and one based on head/eye tracking, and/or a "combination" of that data, could be generated if desired.

In one embodiment the data indicating which resolution version to use where for the output frame generated by an application (e.g.) is pre-processed to provide it in a particular, in an embodiment selected, in an embodiment predetermined, format (e.g. having a restricted resolution), before being provided to the display processor for use.

In the case of using transparency (alpha) values, a "density map" or similar data structure as discussed above may first be generated, and then converted to corresponding transparency values, in an embodiment in a separate processing pass, e.g. in software and/or on the producer processing unit (e.g. GPU) that is generating the different resolution versions of the frame. Alternatively, the transparency (alpha) values could be generated directly, if desired. Other arrangements would also be possible.

The display processor can comprise any suitable and desired display processor that is operable to provide frames generated by a producer processing unit of a data processing system to a display for display. Thus the display processor should be operable to read data of frames from memory, perform appropriate "display processing" on those frames, and then provide the processed frames to the display for display. In an embodiment, the display processor provides the frames to the display for display via a "direct" connection to the display, i.e. is operable to stream the frames (the data for the frames) to the display, rather than transferring the frames to the display via memory for example. The display processor may have a wired or wireless connection to the display.

The display processor includes an input stage operable to read data of input frames from memory where that data is stored. In an embodiment, the input stage comprises a memory read sub-system, that in an embodiment comprises a read controller, such as for example a Direct Memory Access (DMA) read controller, configured to (operable to) read data of input frames from a memory in which the input frames are stored.

In an embodiment the input stage is operable to fetch data of input frames to be processed by the display processor from memory into a local buffer or buffers of the display processor (and thus the display processor in an embodiment comprises one or more local buffers operable to store data of an input frame or frames to be processed by the display processor).

The display processor includes at least one transformation stage that is operable to generate a view orientation transformed output frame using data of input frames (i.e. that is operable to transform input frames read by the input stage based on a view orientation to provide view orientation transformed versions of the input frames). The transformation stage in an embodiment processes the input frames from the local buffer or buffers of the display processor.

The display processor may comprise a single transformation stage, but in an embodiment, comprises a plurality of transformation stages.

In an embodiment, the display processor comprises a plurality of display processing pipelines, each of which is operable to process one or more input frames for display, and each of which comprises its own, respective transformation stage.

In an embodiment each display processing pipeline also includes its own respective, layer processing pipeline that, in an embodiment, follows the transformation stage in the display processing pipeline sequence. The layer processing pipelines may be operable, for example, to perform colour management functions and the like.

The display processor in an embodiment comprises one or two such display processing pipelines (and in one embodiment comprises two (and only two) such display processing pipelines).

In an embodiment, the display processor comprises a composition stage that is operable, inter alia, to composite view orientation transformed frames generated by different transformation stages, and in an embodiment by different display processing pipelines of the display processor, so as to provide an overall view orientation transformed output frame for display.

The output stage of the display processor may be any suitable output stage operable to provide an output frame for display to a display, e.g. to cause the output frame for display to be displayed on the display. The output stage in an embodiment comprises a processing pipeline that performs any necessary further display processing operations on the output frame to be displayed. The output stage in an embodiment comprises appropriate timing control functionality (e.g. it is configured to send pixel data to the display with appropriate horizontal and vertical blanking periods), for the display.

The output stage in an embodiment sends an output frame directly to the display for display, e.g., and in an embodiment, as a stream of data elements (pixels) for display. The data for a frame may be provided via a wired or wireless connection to the display, as desired.

The display will then operate to display the received frame (e.g., and in an embodiment, in the normal manner of operation for the display in question). Thus, the data elements (pixels) for the frame will be appropriately scanned onto the panel of the display, to display the frame.

The various stages of the display processor may be implemented as desired, e.g. in the form of one or more fixed-function circuits (hardware) (i.e. that is dedicated to one or more functions that cannot be changed), or as one or more programmable processing stages, e.g. by means of programmable circuits that can be programmed to perform the desired operation. There may be both fixed function and programmable circuits.

One or more of the various stages of the display processor may be provided as separate circuit elements to one another. Additionally or alternatively, some or all of the stages may be at least partially formed of shared circuits.

A (and each) transformation stage of the display processor may be implemented in any suitable and desired manner. It is in an embodiment provided by suitable processing circuitry (a suitable processing circuit). It may be provided, for example, by means of suitable programmable processing circuitry (circuit) that can be programmed to operate in the desired manner, or provided as fixed function processing circuitry (circuit) that is configured to perform the required processing operation(s). Where fixed-function circuitry (circuit) is used to perform the transformation operation, then that fixed-function circuitry (circuit) is in an embodiment arranged to have limited configurability in use, such as it being possible to vary one or more control parameters for the operation that the circuitry (circuit) performs, so as to facilitate some variation in the configuration of the operation of the fixed-function circuitry (circuit).

The (and each) transformation stage operates to generate a view orientation transformed output frame (i.e. to transform a frame to be displayed based on a view orientation (e.g., and in an embodiment, based on received view orientation data)).

The view orientation that the frame to be displayed is transformed based on can be any suitable and desired view orientation. In an embodiment, the view orientation represents and corresponds to a desired view orientation that the frame is to be displayed as if viewed from (that the frame that is to be transformed is to be displayed with respect to).

Thus, the view orientation transformation is in an embodiment so as to transform the frame to provide a representation of the frame as if viewed from a desired view orientation. In an embodiment, the transformation stage operates to generate a projection of the input frame based on the desired view orientation.

The transformation stage (or stages) of the display processor is in an embodiment operable to transform a (and each) frame for display based on a desired predicted view orientation.

The predicted view orientation that a frame is transformed based on could comprise a predicted view position and/or a predicted view direction. In an embodiment, it comprises both a predicted view position and a predicted view direction.

The predicted view orientation is in an embodiment based on a sampled view orientation (e.g. head position and/or direction), together with information about the time when the frame will be displayed, in an embodiment to predict a view orientation for the user during actual display of the frame.

Thus, in an embodiment, the technology described herein comprises (and the data processing system is appropriately configured to) periodically sampling view orientation data (e.g. head pose data) (e.g., and in an embodiment, by means of appropriate sensors of a head-mounted display that the display is part of), and using the sampled view orientation data when transforming a frame to provide a view orientation transformed version of the frame for display.

The head pose tracking data that is sampled and used in this regard can comprise any suitable and desired head pose tracking data. In an embodiment, it is data that is indicative of a view direction and/or position (and in an embodiment both), and in an embodiment tracks one or more of, and in an embodiment all of: head rotation and head translation.

The head pose tracking data can be determined as desired. For example, it could be generated by an appropriate sensor, such as an inertial measurement unit (IMU) that is associated with the display, a tracking system or a camera of the data processing system. In general, the sensed head pose data can be, and is in an embodiment, provided by a suitable system that can be queried at any point for a low latency, high accuracy source of head pose (in an embodiment rotation and position) data. The head pose tracking system could track rotation only, or rotation and position, or rotation and position and velocity, etc., as desired.

In an embodiment, the producer processing unit (e.g. GPU) is configured to generate a frame for display based on a currently sensed view orientation, with the transformation stage(s) then transforming the frame that is generated based on the sensed view orientation to a new, predicted, view orientation based on the time when the frame will be displayed.

The actual determination of the predicted view orientation using the sensed head pose data can be performed in any suitable and desired component or element of the data processing system. Thus it may, for example, be generated in a suitable processor, such as a CPU, or other processor, of the data processing system. This is in an embodiment done as part of the driver operation for the display processor (e.g., and in an embodiment, that executes on a CPU (e.g. host processor) of the data processing system).

The transformations based on view orientations are in an embodiment performed using transformation matrices. These transformation matrices can take any suitable and desired form that would be operable to perform the appropriate transformation to re-project a frame from the view orientation that the frame has been generated with respect to, to the desired (and in an embodiment predicted) view orientation that it is to be displayed with respect to. Thus, for example, the matrices should, and in an embodiment do, perform rotational reprojection of perspective images and regular 2D images into a virtual perspective camera via a homography.

The (and each) transformation stage in an embodiment operates to produce an output, view orientation transformed frame on a sampling position-by-sampling position (e.g. pixel-by-pixel) basis, i.e. as a stream of view orientation transformed frame sampling positions (pixels) (sampling position (pixel) values). This is in an embodiment done by the transformation stage generating the output view orientation transformed frame by generating the data value for a respective sampling position (e.g. pixel) in the output view orientation transformed frame from the data values for sampling positions (e.g. pixels) in one, or in more than one, of the different resolution versions of the frame generated by the producer processing unit.

In an embodiment, a transformation stage generates an output view orientation transformed frame data element (pixel) by determining for the output view orientation transformed frame data element (pixel) position, the corresponding position (coordinate) in the frame generated by the producer processing unit from which the data for that data element (pixel) position in the view orientation transformed output frame should be taken.

In other words, the transformation stage in an embodiment determines the position in the frame generated by the producer processing unit that will be moved to the data element (pixel) position in the view orientation transformed output frame by the transformation that the transformation stage applies.

This is in an embodiment done for plural, and in an embodiment for each, data element (pixel) position in the view orientation transformed frame that it is desired to generate.

The transformation stage can determine which input frame position should be sampled for a given view orientation transformed output frame data element (e.g. pixel) position in any suitable and desired manner.

In an embodiment, the transformation stage determines for an output view orientation transformed frame data element (pixel) position x, y, the corresponding input frame position from which the data for that data element (pixel) position in the view orientation transformed output frame should be (is to be) taken, based on the view orientation transformation that the transformation operation is to apply, and, in an embodiment, one or more of, and in an embodiment both of: a lens distortion correction and a chromatic aberration correction.

In an embodiment, the transformation stage determines for an output view orientation transformed frame sampling (pixel) position x, y, a set of three corresponding input frame positions (coordinates) $((x_r, y_r) (x_g, y_g) (x_b, y_b))$, one for each colour plane, to be sampled, based on a lens distortion and chromatic aberration that the transformation stage is configured to take account of, and the view orientation transformation to be applied.

Once the position or positions in the input frame whose data is to be used for a data element (pixel) position in the output view orientation transformed frame to be generated by the transformation stage has been determined, then one (or more) of the different resolution versions of the (input) frame to be displayed generated by the producer processing unit can be, and are in an embodiment, sampled at the determined position or positions, so as to provide the data values to be used for the data element (pixel) (sampling position) in the output view orientation transformed frame that is being generated by the transformation stage.

This sampling can be performed as desired, for example using bilinear or trilinear filtering (interpolation). In an embodiment, bilinear filtering (interpolation) is used to sample within a single resolution version of a frame, and tri-linear filtering (interpolation) is used to sample and combine two different resolution versions of a frame when that is required. The transformation stage in an embodiment includes an appropriate filtering (interpolation) circuit(s) for this purpose.

In one embodiment, each of the different resolution versions of the frame to be used in combination to provide the overall, view orientation transformed output frame is respectively subjected to the view orientation transformation, and then the plural view orientation transformed different resolution versions of the frame are combined to provide the view orientation transformed output frame for display.

In this case, each different resolution version of the frame that is to be view orientation transformed and used to provide the overall output frame for display is in an embodiment view orientation transformed by a separate (different) transformation stage of the display processor. In an embodiment, each different resolution version of the frame is processed (and view orientation transformed by) a respective, different display processing pipeline of the display processor.

The plural view orientation transformed different resolution versions of the frame are in an embodiment then (appropriately) combined (composited) in a composition stage (composition unit) of the display processor, based on the data indicating which resolution version of the frame to use where for the output frame, to provide the overall output view orientation transformed frame to be displayed.

Thus, in one embodiment, the display processor generates the view orientation transformed output version of the frame to be displayed using data from the plural different resolution versions of the frame based on the data indicative of which resolution version of the frame is to be used for respective regions of the output version of the frame (and the display processor is correspondingly configured to) by:

for each of plural different resolution versions of the frame generated by the producer processing unit, generating a respective view orientation transformed version of that resolution version of the frame to be displayed; and combining the plural view orientation transformed versions of the plural different resolution versions of the frame based on the data indicative of which resolution version of the frame is to be used for respective regions of the view orientation transformed output version of the frame to be displayed, to provide a view orientation transformed output version of the frame for display that comprises a combination of the view orientation transformed versions of the plural different resolution versions of the frame.

Correspondingly, in an embodiment, the display processor comprises a plurality of transformation stages each operable to generate a view orientation transformed output frame using data of an input frame read by the input stage, and a composition stage operable to combine the view orientation transformed output frames generated by the transformation stages; and the method comprises (and the display processor is configured to):

each of a plurality of the transformation stages of the display processor transforming a different one of the plural different resolution versions of the frame to be displayed generated by the producer processing unit based on a view orientation, to provide a view orientation transformed version of that respective resolution version of the frame; and the composition stage compositing the plural view orientation transformed versions of the different resolution versions of the frame generated by the transformation stages based on the data indicative of which resolution version of the frame generated by the producer processing unit is to be used for respective regions of the view orientation transformed output version of the frame to be displayed, to provide a view orientation transformed output version of the frame for display that comprises a combination of the view orientation transformed versions of the plural different resolution versions of the frame.

In this case, when performing the view orientation transformation of a given different resolution version of the frame, the view orientation transformation will in an embodiment be performed in the manner discussed above, with the determined position(s) in the input frame being sampled in the resolution version of the frame in question (e.g., and in an embodiment, using bilinear filtering), to derive the corresponding output view orientation transformed frame data value(s) for the output frame position (pixel) in question.

In this case, the data indicating which resolution version of the frame to use where for the output frame is in an embodiment in the form of respective blending parameter, e.g., and in an embodiment, transparency (alpha), values associated with the (data elements of) the different resolution versions of the frame, that the composition stage of the display processor can then use to blend (combine) the view orientation transformed different resolution versions of the frame together to provide the overall output view orientation transformed output frame.

In these embodiments, any lower resolution version of the frame (i.e. other than the highest resolution version of the frame that is being used) is in an embodiment first upscaled to the resolution of the highest resolution version of the frame that is being used before being subjected to the view orientation transformation. This facilitates more straightforwardly combining the different resolution versions of the frame to provide the overall output frame.

The upscaling can be done at any desired stage of the process, but in an embodiment, the transformation stage in question is also operable to (and operates to) upscale any version of a frame that is to be view orientation transformed that has a lower resolution than the highest resolution version of the frame that is to be view orientation transformed, to the resolution of the highest resolution version of the frame that is to be view orientation transformed when generating the output frame, before then using the upscaled version of the lower resolution version of the frame to generate the view orientation transformed version of the lower resolution version of the frame.

This will then mean that each view orientation transformed "different" resolution version of the frame will be output by a transformation stage at the same (and at the highest) resolution that is being used. This will then facilitate more straightforwardly combining (compositing) the view orientation transformed different resolution versions of the frame to provide the overall output frame.

In another embodiment, a single (and in an embodiment each) transformation stage of the display processor is able to generate (and generates) a view orientation transformed output frame for display from a combination of the plural different resolution versions of the frame (and is used to do that). In this case, a single transformation stage would then be able to, and does in an embodiment, process (and use) (all of) the plural different resolution versions of the frame that are required for generating the output frame.

In this case, where the display processor comprises plural transformation stages (e.g. plural display processing pipelines, each comprising a respective transformation stage), then each remaining transformation stage (display processing pipeline) could be left idle, or, in an embodiment, could be (and is) used to process a different output frame in parallel. For example, one transformation stage (one display processing pipeline) could be used to process the left eye frame (image) and another transformation stage (display processing pipeline) used to process the right eye frame (image) of a pair of left and right eye frames (images) to be used to display an output frame on a head mounted, and/or virtual reality or augmented reality, display.

In this case, the view orientation transformed output frame for display will be, and is in an embodiment, generated by the transformation stage sampling appropriately from the set of plural different resolution versions of the frame generated by the producer processing unit, based on the data indicating which resolution version to use for which regions of the output frame.

Thus, the transformation stage will in an embodiment determine a set of input frame position(s) to be sampled to provide the data values for a data element (sampling position) in the output view orientation transformed frame, but the transformation stage will in an embodiment then also use the data indicative of which resolution version of the frame generated by the producer processing unit is to be used for respective regions of the view orientation transformed output version of the frame being generated to determine which version or versions of the plural different resolution versions of the frame generated by the producer processing unit to sample the data from at that set of input frame position(s).

In this case therefore, the transformation stage will use the data indicative of which resolution version of the frame is to be used for respective regions of the view orientation transformed output version of the frame to determine which version or versions of the plural different resolution versions of the frame should be used for the view orientation transformed output frame position being generated, and then sample the so-determined different resolution version or versions of the input frame at the determined position(s) to generate the output view orientation transformed frame data element (pixel) in question.

Thus, in another embodiment, the display processor generates the view orientation transformed output version of the frame to be displayed using data from the plural different resolution versions of the frame based on the data indicative of which resolution version of the frame is to be used for respective regions of the output version of the frame (and the display processor is correspondingly configured to) by:

a transformation stage of the display processor, for each of plural data elements in the view orientation transformed output version of the frame being generated;

determining a set of one or more input frame position(s) to be sampled to provide the data value(s) for the data element in the output view orientation transformed frame;

using the data indicative of which resolution version of the frame generated by the producer processing unit is to be used for respective regions of the view orientation transformed output version of the frame being generated to determine which version or versions of the plural different resolution versions of the frame generated by the producer processing unit to sample at the determined set of one or more input frame position(s); and then sampling the so-determined different resolution version or versions of the input frame at the determined position(s) to provide the data value(s) of the output view orientation transformed frame data element.

Correspondingly, in an embodiment, a (and in an embodiment each) transformation stage of the display processor is configured to:

determine, for each of plural data elements in the view orientation transformed output version of the frame being generated, a set of one or more input frame position(s) to be sampled to provide the data value(s) for the data element in the output view orientation transformed frame;

use the data indicative of which resolution version of the frame generated by the producer processing unit is to be used for respective regions of the view orientation transformed output version of the frame being generated to determine which version or versions of the plural different resolution versions of the frame generated by the producer processing unit to sample at the determined set of one or more input frame position(s); and sample the so-determined different resolution version or versions of the input frame at the determined position(s) to provide the data value(s) of the output view orientation transformed frame data element.

In this case, the data indicating which resolution version of the frame to use where for the output frame is in an embodiment in the form of a two-dimensional array (e.g. density map) representing the (area of the) output frame to be displayed, or some other form of representation (such as a bounding box or a functional representation) indicating which resolution versions of the frame to use across (the area of) the output frame to be displayed. (Rather than comprising some form of transparency (alpha) values, for example.)

In an embodiment, the data indicating which resolution version of the frame to use where for the output frame will be fetched by the display processor (e.g. into local storage of the display processor), and may, e.g., be upscaled, before then being used to determine which version or versions of the plural different resolution versions of the frame to sample for the output frame data element in question.

The data indicating which resolution version of the frame to use where for the output frame is used to identify which resolution version or versions (which mipmap levels) are needed for the data element in question, and, in an embodiment, to trigger the fetching of relevant regions of the so-determined different resolution version or versions of the frame generated by the producer processing unit for use by the display processor (e.g. into local storage of the display processor).

The transformation stage will then sample the so-fetched different resolution version or versions of the input frame at the determined positions to provide the output view orientation transformed data element (pixel) in question.

In this operation, where there is only a single resolution version of the frame to be sampled for a given data element in the output frame, then the transformation stage in an embodiment samples that single determined resolution version of the frame in an appropriate manner, such as, and in an embodiment, using bilinear filtering.

On the other hand, in the case where the data indicating which resolution version of the frame to use where the output frame indicates that two (or more) different resolution versions of the frame should be sampled (used for) a given output frame data element (pixel), then the transformation stage should, and in an embodiment does, appropriately sample from the two or more different resolution versions of the frame that are to be combined. In one embodiment, this comprises using an appropriate filtering arrangement, such as, and in an embodiment, tri-linear filtering, to sample (and blend) the data values from the indicated plural different resolution versions of the frame for the output view orientation and transformed frame data element (pixel) in question.

In an embodiment, the process (e.g. the transformation stage) comprises (and operates to) upscaling any resolution version regions of the frame that are to be sampled from that are lower than the highest resolution version of the frame that is being used to generate the output frame, in an embodiment to match the highest resolution, with the sampling then being performed using the upscaled versions of the input frame regions. This may help to facilitate blending between the different resolution versions when sampling plural different resolution versions of the input frame for an output frame data element (pixel), and/or to smooth the transition between different resolution regions in the output frame.

It would also be possible, where two lower resolution versions (but which are not the highest resolution version of the frame) are to be sampled from, to upscale the lower resolution version of the pair to match the resolution of the highest resolution version of the pair before performing the sampling operation. In this case, some further smoothing (filtering) operation to smooth the transition between regions generated with different highest resolution versions of the input frame in the output version of the frame is in an embodiment then performed.

The sampling (and filtering) process when generating the data elements in the view orientation transformed output frame in an embodiment also takes account of, and acts to smooth, the transitions between regions of the output frame that will be generated using different resolution (or at least different highest resolution) versions of the input frame.

In particular, the Applicants have recognised that at the border (transition) between different resolution regions in the output frame, then it may be desirable to sample within a given resolution version of the input frame on both sides of the border. That being the case, it would be desirable for there to be valid data for the resolution version of the frame in question on both sides of the border.

In one embodiment, this is ensured by the producer processing unit generating the different resolution versions of the frame such that they all overlap (at least to some extent) in the border regions.

In another embodiment, where the producer processing unit does not generate the different resolution versions of the frame such that they overlap (where there isn't overlap) between the different resolution versions at the border regions, then additional data is generated for the different resolution versions of the frame that is generated by the producer processing unit at the border regions, so as to provide data values extending outside the border regions for the different resolution versions of the frame so as to provide valid data for sampling when sampling in a given resolution version of the input frame at the border between different resolution versions of the input frame in the output frame.

This could be achieved, for example, by the producer processing unit (e.g. GPU) pre-blending a lower resolution level into the higher resolution level in advance (before the different resolution versions of the frame are provided to the display processor), so as to provide sufficient data in the higher resolution region to allow sampling within that higher resolution version across the border. Alternatively or additionally, such additional data element values at the borders between the different resolution versions could be generated for the regions of the different resolution versions of the input frame as they are loaded into the local buffer on the display processor.

As discussed above, in an embodiment, the data of the different resolution versions of the input frame is loaded into a local buffer or buffers of the display processor for use. In an embodiment, a (and each) transformation stage is operable to identify regions (and in an embodiment respective two-dimensional blocks (areas)) of the different resolution input frame versions whose data will be required for generating, e.g. a row of, the transformed output frame that is currently being generated, and to cause the input stage of the display processor to load the necessary input frame regions (blocks) into an input, e.g. local, buffer or buffers of the display controller, so as to be available for use by the transformation stage when the corresponding output transformed frame sampling position or positions is to be generated. This may help in particular to facilitate being able to generate the output transformed frame as a contiguous sequence of sampling positions for rows of the transformed output frame in turn.

In this arrangement, the transformation stage in an embodiment, if necessary, also indicates and determines which of the different resolution input frame versions data it requires. In the case where the transformation stage is simply producing a view orientation transformed version of a given one of the different resolution versions of the input frame generated by the display processor, then the transformation stage can simply indicate that it is a block or blocks of that resolution input frame version that is required.

In the case where the transformation stage is operable to process and combine plural different resolution versions of the input frame, then the transformation stage in an embodiment uses the data indicating which of the plural different resolution versions of the frame to use for output view orientation transformed frame regions to determine which different resolution version or versions of the input frame generated by the producer processing unit are required, and to trigger the input stage of the display processor to load the necessary input frame regions (blocks) from those different resolution versions of the frame generated by the producer processing unit.

The blocks (areas) of the input frame that are loaded in this regard may be any suitable and desired blocks (areas) of the different resolution input frame versions. Each block in an embodiment comprises an (two dimensional) array of defined sampling (data) positions (data elements) of the input frame and extends by plural sampling positions (data elements) in each axis direction. The blocks are in an embodiment rectangular, and in an embodiment square. The blocks may, for example, each comprise 4×4, 8×8 or 16×16 sampling positions (data elements) of the input frame.

In an embodiment, this is done by the transformation stage using the integer part of the input frame position that is to be sampled for an output transformed frame sampling position (data element) to identify a block (area) of the input frame whose data will be required for generating the output transformed frame sampling position, and then indicating that block position (e.g. integer value) to the input stage of the display controller to cause the input stage of the display controller to fetch the appropriate block of (one or more of) the different resolution input frame versions the input frame into a local buffer of the display controller from where the transformation stage will read the desired input frame version sampling positions to generate the output transformed frame sampling position.

Although the technology described herein is described above with particular reference to the operation of the overall data processing system, the technology described herein also extends to the display processor and the operation of the display processor per se.

Thus, a further embodiment of the technology described herein comprises a method of operating a display processor operable to provide frames to a display for display, the display processor comprising:
an input stage operable to read data of input frames;
an output stage operable to provide frames for display to a display; and
at least one transformation stage operable to:
generate a view orientation transformed output frame using data of an input frame read by the input stage;
the method comprising:
the input stage of the display processor reading data of some or all of plural different resolution versions of a frame to be displayed;
the display processor generating a view orientation transformed output version of the frame to be displayed using data from the plural different resolution versions of the frame to be displayed read by the input stage based on data indicative of which resolution version of the frame is to be used for respective regions of the view orientation transformed output version of the frame to be displayed;
and
the output stage of the display processor providing the view orientation transformed output version of the frame to a display for display.

A further embodiment of the technology described herein comprises a display processor operable to provide frames to a display for display, the display processor comprising:
an input stage operable to read data of input frames;
an output stage operable to provide frames for display to a display; and
at least one transformation stage operable to:
generate a view orientation transformed output frame using data of an input frame read by the input stage;
wherein:
the input stage of the display processor is configured to read data of some or all of plural different resolution versions of a frame to be displayed;
the display processor is configured to generate a view orientation transformed output version of a frame to be displayed using data from plural different resolution versions of the frame to be displayed read by the input stage based on data indicative of which resolution version of the frame is to be used for respective regions of a view orientation transformed output version of the frame to be displayed to be generated by the display processor for display provided to the display processor; and
the output stage of the display processor is configured to provide the view orientation transformed output version of the frame to a display for display.

As will be appreciated by those skilled in the art, these embodiments of the technology described herein can, and in an embodiment do, include any one or more or all of the features of the technology described herein described herein, as appropriate.

Although the technology described herein has been described above with particular reference to the generation and processing of a single frame, as will be appreciated by those skilled in the art, the operation in the manner of the technology described herein is in an embodiment performed for plural frames that are to be displayed, and in an embodiment for each frame of a sequence of plural frames that is to be displayed. Thus, in an embodiment, the operation in the manner of the technology described herein is used to generate a sequence of plural output frames for display to a user, and correspondingly, the operation in the manner of the technology described herein is in an embodiment repeated for plural output frames to be displayed.

Thus, for example, a producer processing unit will produce a sequence of plural output frames to be displayed, with the display processor then processing those frames appropriately to provide them to the display for display.

The generation and processing of the frames for display may also, accordingly, and in an embodiment, comprise generating a sequence of "left" and "right" frames to be displayed to the left and right eyes of the user, respectively.

Each pair of "left" and "right" frames for display may be generated from a common input frame, or from respective "left" and "right" input frames, as desired.

The display in the technology described herein can be any suitable and desired form of display, and can comprise any suitable and desired components and elements that a display may comprise, such as, and in an embodiment, a display panel, a display driver circuit for scanning frame data to the display panel, and a display receiver for receiving data to be displayed on the display panel. The display may also comprise appropriate local (on-chip) frame data storage, such as a frame buffer. The display may comprise the overall data processing system's (device's) local display (screen) and/or an external display. There may be more than one display output, if desired.

In an embodiment, the display comprises a head-mounted display, e.g., and in an embodiment, for virtual reality and/or augmented reality display. In this case, the display should, and in an embodiment does, accordingly comprise a display panel for displaying the frames to the user, and a lens or lenses through which the user will view the displayed frames.

Correspondingly, in an embodiment, the display has associated view orientation determining (e.g. head tracking) sensors, which, in an embodiment periodically, generate view tracking information based on the current and/or relative position of the display, and are operable to provide that view orientation periodically to processing units of the data processing system, e.g., in an embodiment, for use when transforming frames based on view orientation.

Thus, another embodiment of the technology described herein comprises a head-mounted display device comprising the data processing system of any one or more of the embodiments of the technology described herein described herein. Correspondingly, another embodiment of the technology described herein comprises a method of operating a head-mounted display device, comprising operating a head-mounted display device in the manner of any one or more of the embodiments of the technology described herein.

As well as the particular units and components required for operation in the manner of the technology described herein, the data processing system may, and in an embodiment does, also comprise one or more of, and in an embodiment all of, any other suitable and desired component, unit, processor, etc., that a data processing system may comprise. Thus the data processing system may comprise one or more of, and in an embodiment all of: a central processing unit, a host processor, a graphics processing unit, a video processor, an image signal processor, a camera, a system bus, and a memory controller. In an embodiment, the data processing system comprises and/or is in communication with, one or more memories and/or memory devices that store data described herein, and/or software for performing the processes described herein.

In an embodiment, the data processing system comprises, and/or is in communication with, one or more memories and/or memory devices that store the data described herein, and/or that store software for performing the processes described herein. The data processing system may also be in communication with the host microprocessor, and/or with a display for displaying images based on the output of the data processing system.

The data processing system could also, if desired, and in an embodiment does, comprise two display processors at least one of which, and in an embodiment both of which, are in accordance with, and operable in accordance with, the technology described herein.

This could be the case where, for example, the electronic device in which the display processors are used comprises both a host device (which could, for example, be a mobile device, such as a phone, or a PC or a console), that then transmits images for display to a (wired or wireless) companion display device (such as, and in an embodiment, a headset), with the companion display device including the display and also a display processor.

In such an arrangement, the display processing can be spread between the host device and the companion device. For example, the host device could prepare the frames for display, but then with the companion device performing the display processing, including any view orientation transformations, etc., to produce the final displayed frames. At the other extreme, the host device could prepare the full, compensated, lens corrected and view orientation transformed output frames, with the companion device then simply doing the final processing of those frames for display.

In an embodiment of the technology described herein, the data processing system of the technology described herein is configured in accordance with the first of these options, namely comprises a host device that, inter alia, produces the plural different resolution versions of frames to be displayed, but then the display processor operation of the technology described herein is performed on a display processor in a companion display device, such as, and in an embodiment, a head-mounted display device.

Thus, in an embodiment, the data processing system includes a host device that includes the producer processing unit, and a companion display device that includes a display processor in the manner of (and that operates in the manner of) the technology described herein. The host device in an embodiment also includes a further display processor, which may also be able to, and in an embodiment is able to, operate in the manner of the technology described herein.

In this arrangement, the host device will generate sets of plural different resolution versions of the frames for display, with the display processor on the companion display device then processing those different resolution versions of the frames for display in the manner of the technology described herein.

In such an arrangement it will be necessary to provide the plural different resolution versions of a frame (e.g. set of mipmaps) to the companion device display processor for processing in the manner of the technology described herein. The companion device display processor will therefore need to, and does in an embodiment, comprise or have access to, an appropriate buffer on the companion device for storing the frames for processing.

While it would be possible in this regard simply to send the different resolution versions of a frame to be displayed in their entirety to the companion device (to the display processor on the companion device), the Applicants have recognised that where only parts of each different resolution version of a frame will be used in the final output frame (as will be the case when generating a foveated display), it is not necessary to send the different resolution versions of a frame in their entirety for processing by the display processor of the companion device, but rather only the required portions of each different resolution version of the frame needs to be sent to the display processor on the companion device. Furthermore, this will then have the effect of reducing, potentially significantly, the transmission bandwidth between the host device and the companion device when generating foveated output frames for display.

Thus, in an embodiment, the host device operates to, once the producer processing unit has produced the set of different resolution versions (e.g. the set of mipmaps) for a frame to be displayed, then determine the parts of those plural different resolution versions of a frame to be displayed that will be required by the display processor on the companion device when using the plural different resolution versions of the frame to generate an output frame for display, and transmit only the determined (selected) parts of the different resolution versions of the frame that have been generated to the companion device for use by the display processor on the companion device.

The parts of the different resolution versions of a frame that will be required by the display processor on the companion device when generating an output frame can be identified and selected as desired. In an embodiment, this is done on the basis of the data indicating which resolution versions of the input frame are to be used where for the output view orientation transformed frame. Thus, in an embodiment, the host device operates to use the data indicating which resolution versions of the input frame are to be used where for the output view orientation transformed frame to identify which regions of each different resolution version of a frame will be needed by the display processor in the companion device when generating the output version of the frame for display, and then transmits to the companion device (data of) those (and only those) identified regions.

In this case, the output frame is in an embodiment divided into a plurality of, in an embodiment regularly sized and shaped, regions, each in an embodiment comprising a rectangular (and in an embodiment square) block of plural data elements (as discussed above), and it is determined for each region in the output frame which resolution version of the frame produced by the producer processing unit will be required, with the host device then transmitting the identified regions of the determined resolution version or versions of the frame to the companion device.

This operation could identify the required regions of the different resolution versions of the frame with greater or lesser precision, as required. In an embodiment, the process operates to crop non-visible (non-used) regions of the different resolution version(s) of the frame, in an embodiment relatively coarsely.

It is believed that such arrangements may be new and advantageous in their own right.

Thus, a further embodiment of the technology described herein comprises a method of operating a data processing system, the data processing system comprising:
a host device comprising:
a producer processing unit operable to generate frames for display on the display; and
a companion display device comprising:
a display operable to display frames for display;
a display processor operable to provide frames generated by the producer processing unit to the display for display, the display processor comprising:
an input stage operable to read data of input frames;
an output stage operable to provide frames for display to the display; and
at least one transformation stage operable to:
generate a view orientation transformed output frame using data of an input frame read by the input stage;
the method comprising:
the producer processing unit generating, for a frame to be displayed, plural different resolution versions of the frame to be displayed;
the host device:
determining the parts of the plural different resolution versions of a frame to be displayed generated by the producer processing unit that will be required by the display processor on the companion device when using the plural different resolution versions of the frame to generate an output frame for display; and
transmitting only the determined parts of the different resolution versions of the frame that have been generated to the companion device for use by the display processor on the companion device;
and
the display processor on the companion device:
generating a view orientation transformed output version of the frame to be displayed using data from the plural different resolution versions of the frame to be displayed generated by the producer processing unit transmitted to the companion device by the host device;
and
providing the view orientation transformed output version of the frame to the display for display.

A further embodiment of the technology described herein comprises a data processing system comprising:
a host device comprising:
a producer processing unit operable to generate frames for display on the display; and
a companion display device comprising:
a display operable to display frames for display;
a display processor operable to provide frames generated by the producer processing unit to the display for display, the display processor comprising:
an input stage operable to read data of input frames;
an output stage operable to provide frames for display to the display; and
at least one transformation stage operable to:
generate a view orientation transformed output frame using data of an input frame read by the input stage;
wherein:
the producer processing unit is configured to generate, for a frame to be displayed, plural different resolution versions of the frame to be displayed;
the host device is configured to:
determine the parts of the plural different resolution versions of a frame to be displayed generated by the producer processing unit that will be required by the display processor on the companion device when using the plural different resolution versions of the frame to generate an output frame for display; and
transmit only the determined parts of the different resolution versions of the frame that have been generated to the companion device for use by the display processor on the companion device;
and
the display processor on the companion device is configured to:
generate a view orientation transformed output version of a frame to be displayed using data from the plural different resolution versions of the frame to be displayed generated by the producer processing unit transmitted to the companion device by the host device;
and
provide the view orientation transformed output version of the frame to the display for display.

As will be appreciated by those skilled in the art, these embodiments of the technology described herein may, and in an embodiment do, include any one or more or all of the features of the technology described herein, as appropriate.

Thus, for example, the host processor in an embodiment provides to the display processor data indicative of which resolution version of the frame generated by the producer processing unit is to be used for respective regions of a view orientation transformed output version of the frame to be generated by the display processor for display.

Similarly, the display processor is in an embodiment configured to generate a view orientation transformed output version of a frame to be displayed using data from plural different resolution versions of the frame to be displayed generated by the producer processing unit read by the input stage based on data indicative of which resolution version of the frame generated by the producer processing unit is to be used for respective regions of a view orientation transformed output version of the frame to be displayed to be generated by the display processor for display provided to the display processor.

The parts of the different resolution versions of a frame that will be required by the display processor on the companion device when generating an output frame can be identified and selected as desired. In an embodiment, this is done on the basis of the data indicating which resolution versions of the input frame are to be used where for the output view orientation transformed frame. Thus, in an embodiment, the host device operates to use the data indicating which resolution versions of the input frame are to be used where for the output view orientation transformed frame to identify which regions of each different resolution version of a frame will be needed by the display processor in the companion device when generating the output version of the frame for display, and then transmits to the companion device (data of) those (and only those) identified regions (at the desired level of granularity).

The comparison device in an embodiment also includes local storage, such as a buffer, for storing on the companion device for use by the display processor on the companion device, the determined parts of the different resolution versions of the frame that have been transmitted to the companion device by the host device.

The host device in an embodiment also packs the selected parts of the different resolution versions of a frame into an appropriate data structure, such as, and in an embodiment, a single frame structure, before transmitting it to the companion device. The so-transmitted parts of the different resolution versions of the frame are in an embodiment then stored appropriately in a buffer of the companion device so as to be available then for use by the display processor of the companion device.

The relevant parts of the different resolution versions of a frame that are sent to the companion device may also be, and in an embodiment are, compressed for transmission (and correspondingly then decompressed on the companion device, e.g. as part of the operation of the display processor on the companion device). Any other necessary format changes, conversion or unpacking of the data should also be performed appropriately on the companion device.

The identification, selection and transmission of the required parts of the different resolution versions of a frame can be performed by any suitable and desired element or component of the host device. In an embodiment, this is done by a display processor of the host device (which would normally otherwise be operable to transmit data for display to the companion display device).

The Applicants have further recognised that in such arrangements and systems, there could also be certain images, such as user interface elements, photos and other 2D "billboards" that may be repeatedly used in successive frames that are being displayed. In an embodiment, frames representing such images are retained from output frame to output frame in the buffer on the display device such that they are available for use for plural output frames on the display device. This then avoids and reduces the need to repeatedly retransmit such frames to the companion display device. This can be done for any form of image (frame) that may be repeatedly reused in a sequence of output frames for which the source frame data will remain static (but which may, e.g., be displayed at different locations in different output frames).

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, engines, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry), and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Furthermore, any one or more or all of the processing stages and engines of the technology described herein may be embodied as processing stage circuitry (circuits), e.g., in the form of one or more fixed-function units (hardware) (processing circuitry (circuits)), and/or in the form of programmable processing circuitry (circuits) that can be programmed to perform the desired operation. Equally, any one or more of the processing stages and processing stage circuitry (circuits) of the technology described herein may be provided as a separate circuit element to any one or more of the other processing stages or processing stage circuitry (circuits), and/or any one or more or all of the processing stages and processing stage circuitry (circuits) may be at least partially formed of shared processing circuitry (circuits).

It will also be appreciated by those skilled in the art that all of the described embodiments of the technology described herein can, and in an embodiment do, include, as appropriate, any one or more or all of the features of the technology described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described.

The present embodiments relate to the process of displaying frames to a user in a head-mounted display system, such as for an augmented reality (AR) or virtual reality (VR) display.

Such a system may be configured as shown in FIG. 1 (and described above), with the display 4 of the system comprising an appropriate head-mounted display that includes, inter alia, a display screen or screens (panel or panels) for displaying frames to be viewed by a user wearing the head-mounted display, one or more lenses in the viewing path between the user's eyes and the display screens, and one or more sensors for tracking the pose of the user's head (their head position and/or their view (gaze) direction) in use (while images are being displayed on the display to the user).

Figure 2:
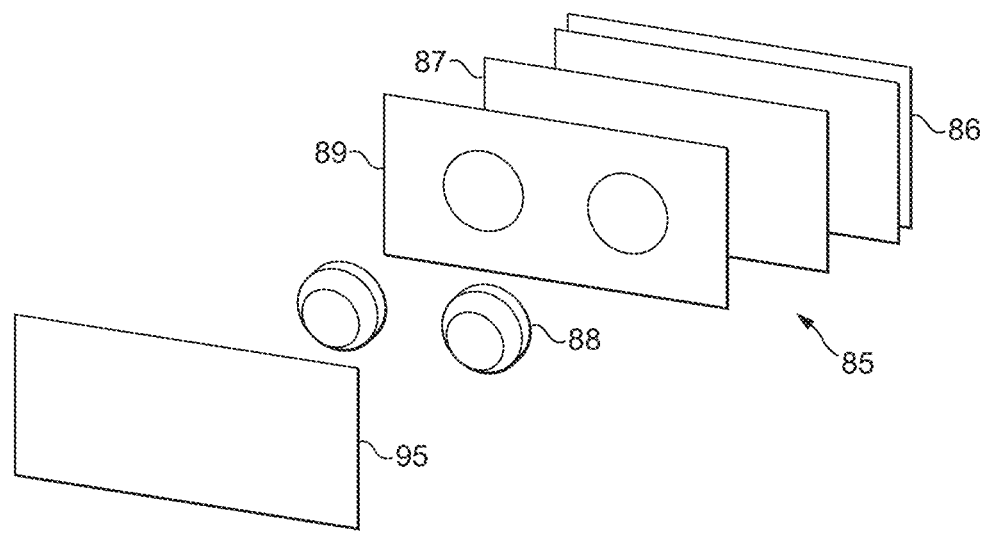
FIG. 2 shows schematically an exemplary head mounted display headset.

FIG. 2 shows schematically an exemplary head-mounted display 85 that may be used in embodiments of the technology described herein. As shown in FIG. 2, the head-mounted display 85 comprises, for example, an appropriate display mount 86 that includes one or more head pose tracking sensors, to which a display screen (panel) 87 is mounted. A pair of lenses 88 are mounted in a lens mount 89 in the viewing path of the display screen 87. Finally, there is an appropriate fitting 95 for the user to wear the headset.

In the system shown in FIG. 1, the display processor 5 will operate to provide appropriate images (frames) to the display 4 for viewing by the user. The display processor 5 may be coupled to the display 4 in a wired or wireless manner, as desired.

Images (frames) to be displayed on the head-mounted display 4 will be, e.g., rendered by the graphics processor (GPU) 2 in response to requests for such rendering from an application 10 executing on a host processor (CPU) 7 of the overall data processing system and store those frames in the main memory 3. The display processor 5 will then read the frames from memory 3 as input surfaces and provide those frames appropriately to the display 4 for display to the user.

The present embodiments relate in particular to the situation in which the data processing system of FIG. 1 is being used to display foveated images on the display 4.

Figure 3:
FIG. 3 illustrates the display of a foveated image.

FIG. 3 shows an example foveated image, in which the fixation point (the region of highest resolution) 40 is towards the left hand side of the image. It can be seen that regions 41 of the image away from the fixation point are displayed with a lower resolution.

In the present embodiment, when performing foveated display, the graphics processor 3 is controlled to render plural, e.g. three, different resolution versions of the input frame to be displayed (thus of the same view of a scene), with those different resolution versions (images) then being appropriately combined to provide the output "foveated" image (output frame) that is displayed. The graphics processor can render the plural different resolution versions of the frame to be displayed in any suitable and desired manner (for example in accordance with the techniques described in the Applicant's US patent application publication No. 2017/031660, which is incorporated herein in its entirety).

Figure 4:
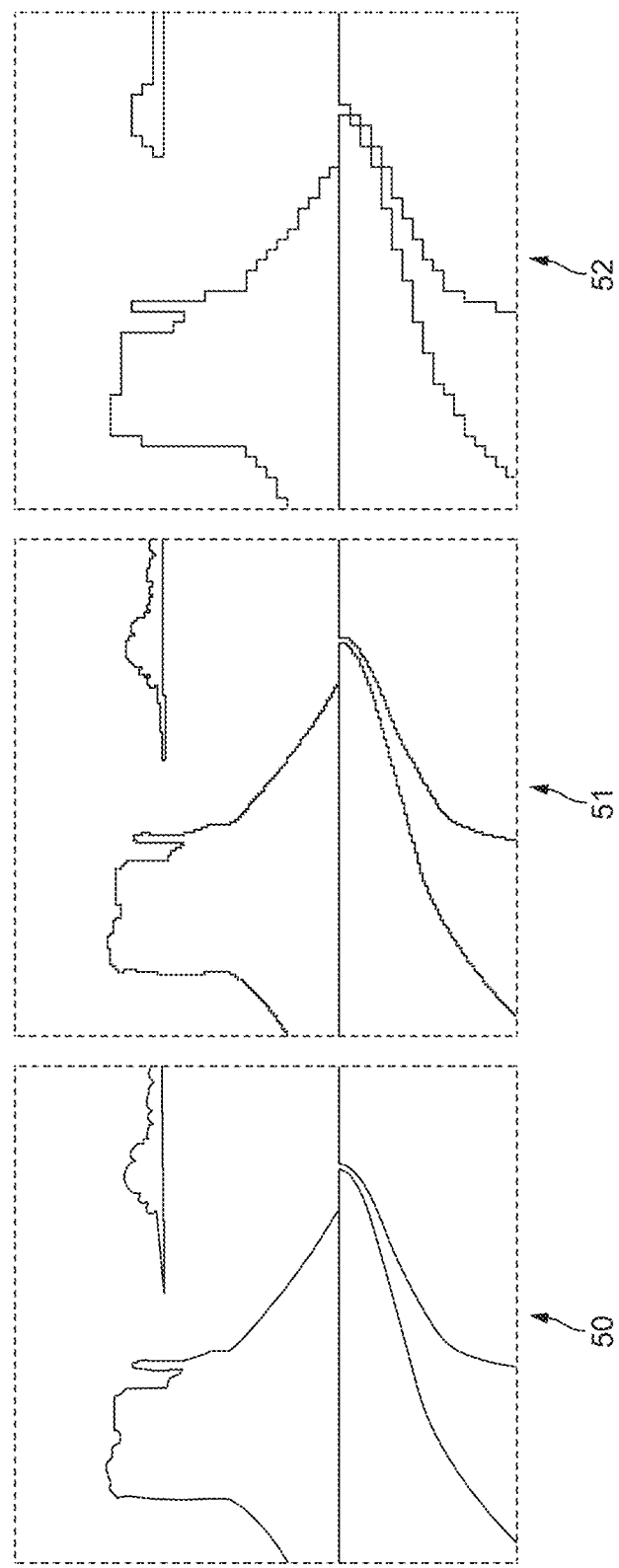
FIG. 4 shows an exemplary set of plural different resolution versions of a frame that may be combined to provide a foveated image for display.

FIG. 4 shows an exemplary set of three different resolution versions (images) of the same view of a scene (of a frame) that may be combined to provide a foveated image (frame) for display, namely: a highest resolution version of the view 50; a "middle" resolution view 51; and a lowest resolution version of the view 52. These different images may then be combined to provide the final, output "foveated" image for display. (In FIG. 4, the different resolution images are shown all scaled to the same size for comparison purposes.)

Figure 5:
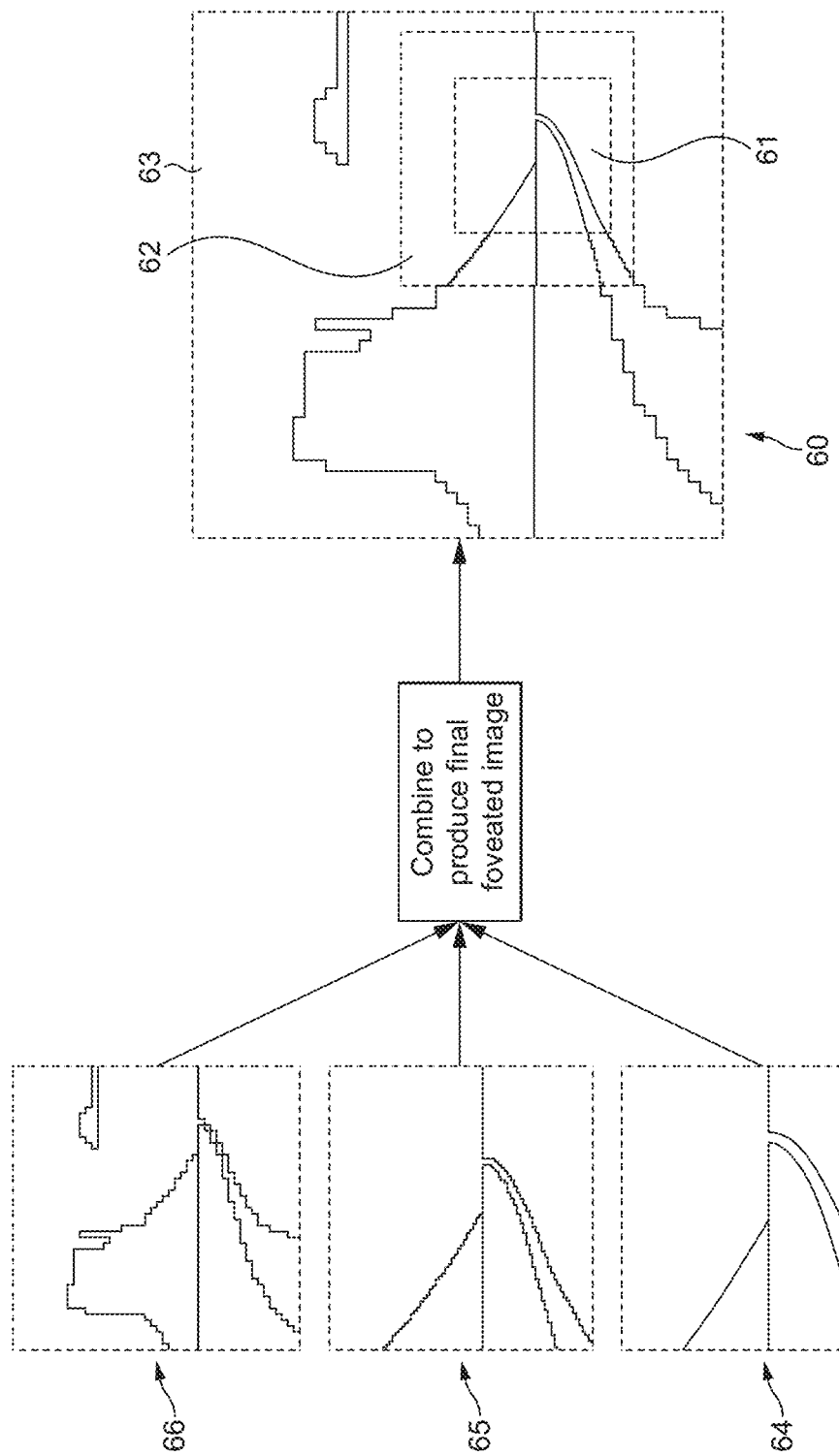
FIG. 5 shows schematically the combining of plural different resolution versions of a frame to provide a foveated image for display.

FIG. 5 shows schematically the combining of different resolution images (versions of a frame) 64, 65, 66 corresponding to the images shown in FIG. 4 to provide a final, foveated output image (frame) 60. As shown in FIG. 5, the final output, foveated image (frame) 60 is made up of the different resolution images 64, 65 and 66, and each of the different resolution images 64, 65, 66 show different fields of view (parts) of the overall scene being rendered.

In particular, the appropriate region of the highest resolution view 64 is displayed in the region 61 of the output foveated frame where, e.g., it is determined that the user is looking, with appropriate regions of the lower resolution views 65, 66, then being progressively displayed in regions 62, 63 of the output frame 60 away from that highest resolution region 61.

In the present embodiments, once the (appropriate parts of each) different resolution images (versions of the frame to be displayed) 64, 65, 66 have been rendered by the graphics processor 3, those versions (images) are stored in appropriate frame buffers in memory 3 of the data processing system. Those different resolution images are then appropriately combined by the display processor 5 to provide the final, output, foveated frame that is displayed (as illustrated in FIG. 5).

Figure 6:
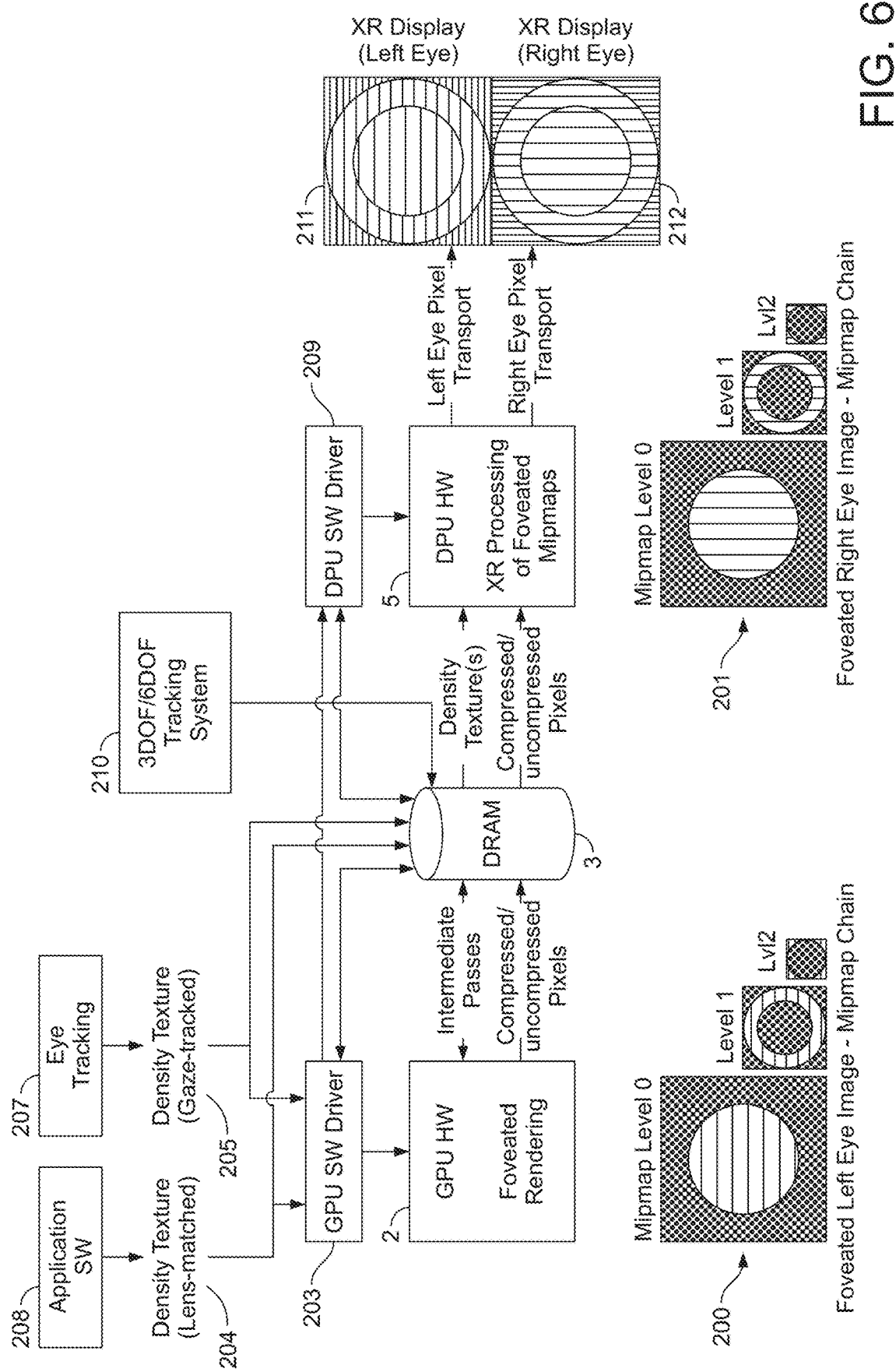
FIG. 6 shows schematically the operation of a data processing system in embodiments of the technology described herein.

FIG. 6 shows schematically the operation of the data processing system when performing such foveated rendering and display in embodiments of the technology described herein.

As shown in FIG. 6, the graphics processor 2 will generate appropriate sets 200, 201 of plural different resolution versions of a frame to be displayed, and store those sets of different resolution versions of the frame to be displayed in the memory 3.

FIG. 6 shows the graphics processor 2 as generating the sets of different resolution versions of a frame to be displayed as appropriate sets of mipmaps (mipmap chains). FIG. 6 also shows the generation of respective sets of mipmaps for a left and right eye image to be displayed. Other arrangements would, of course, be possible.

As shown in FIG. 6, the graphics processor 2 generates the respective sets of different resolution versions of the frame to be displayed under the control of an appropriate driver 203 that will, for example, be executing on the CPU 7 of the data processing system.

As shown in FIG. 6, the driver 203 controls the graphics processor 2 to generate the sets of different resolution versions of the frame to be displayed in accordance with data indicating which resolution versions of the frame to use for which regions of the frame, in the form of a first density texture 204 that indicates the different resolution versions of the frame to be used for different regions of the frame based on the properties of the lens system that the frame will be viewed through (which may, e.g., be generated by an appropriate application executing on the CPU 7), and a second density texture 205 based on analysis of the viewer's current gaze direction (which may be generated in accordance with appropriate head/eye tracking information 207 that is provided).

In this embodiment, the density textures 204, 205 are in the form of two-dimensional arrays representing the (area of the) output frame to be displayed, with respective data element positions within the array then indicating which resolution version of the frame to use for a given region (block/tile) within the output frame.

Figure 13:
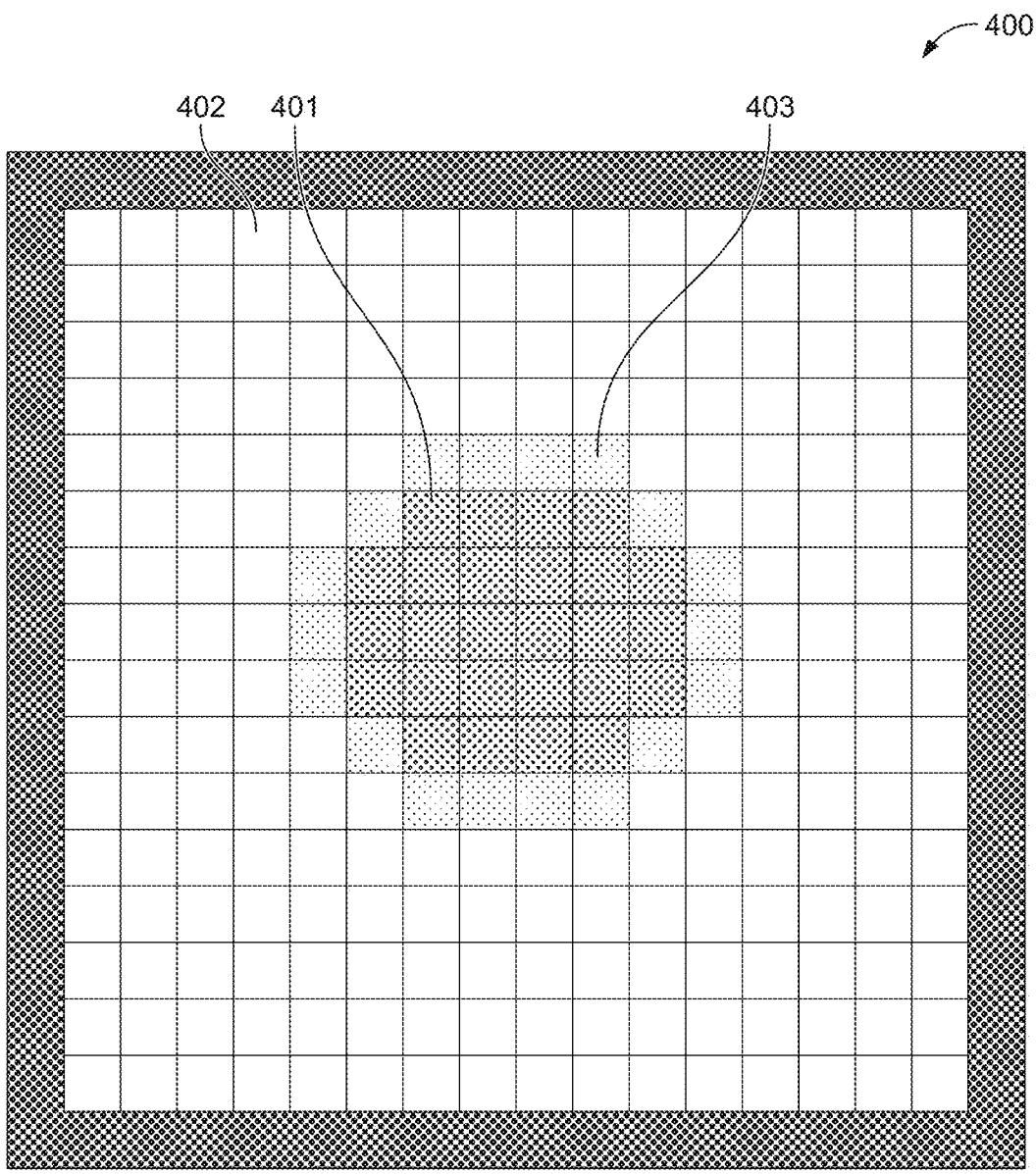
FIG. 13 shows an exemplary density texture that may be used in an embodiment of the technology described herein.

FIG. 13 shows an exemplary density texture 400. In this figure the darkest texture positions 401 show where higher resolution versions of the frame will be displayed, with the lightest texture positions 402 showing where the lowest resolution version of the frame will be displayed, and the "mid-grey" texture positions 403 showing where a combination of the highest and lowest resolution regions of the frame should be displayed. In practice these density texture positions will each be represented by (will have stored for them) a suitable (grayscale) value, that will indicate which resolution version or versions of the frame to use for the output frame region that corresponds to the density texture position in question.

The density textures 204, 205 could use integer data values and so indicate only a single one of the different resolution versions to use for a (and each) frame region, or could use fractional values (or a gradient (which can then be converted to a fractional value)), with a non-integer fractional value (level) then indicating that two different resolution versions (mipmap levels) should be combined for that output frame region. Other arrangements would, of course, be possible.

The data indicating the different resolution versions of the frame to use for respective output frame regions could also be provided in other forms, for example by means of a lookup table, or by some form of functional representation, or in the form of a bounding box (e.g. a 2D axis-aligned bounding box) that defines the area region(s) where the highest resolution version (level) should be used (with all other regions then being generated from a or the lower resolution (level) version of the frame).

Once the graphics processor 2 has generated the appropriate set(s) of different resolution versions of the frame to be displayed, the display processor 5 will read those different resolution versions of the frame to be displayed from the memory 3 and provide an appropriate view orientation transformed output frame or frames 211, 212 (e.g. one frame for each eye), for display.

This operation is performed, as shown in FIG. 6, under the control of an appropriate driver 209 for the display processor (which again may be executing on the CPU 7), and will also use, as shown in FIG. 6, the density textures indicating which resolution versions of the frame are to be used for which regions of the output frame, and also "latest" gaze tracking information 210 detected by the appropriate gaze tracking sensors of the head mounted display. The operation of the display processor 5 in this regard will be discussed in more detail below.

Figure 7:
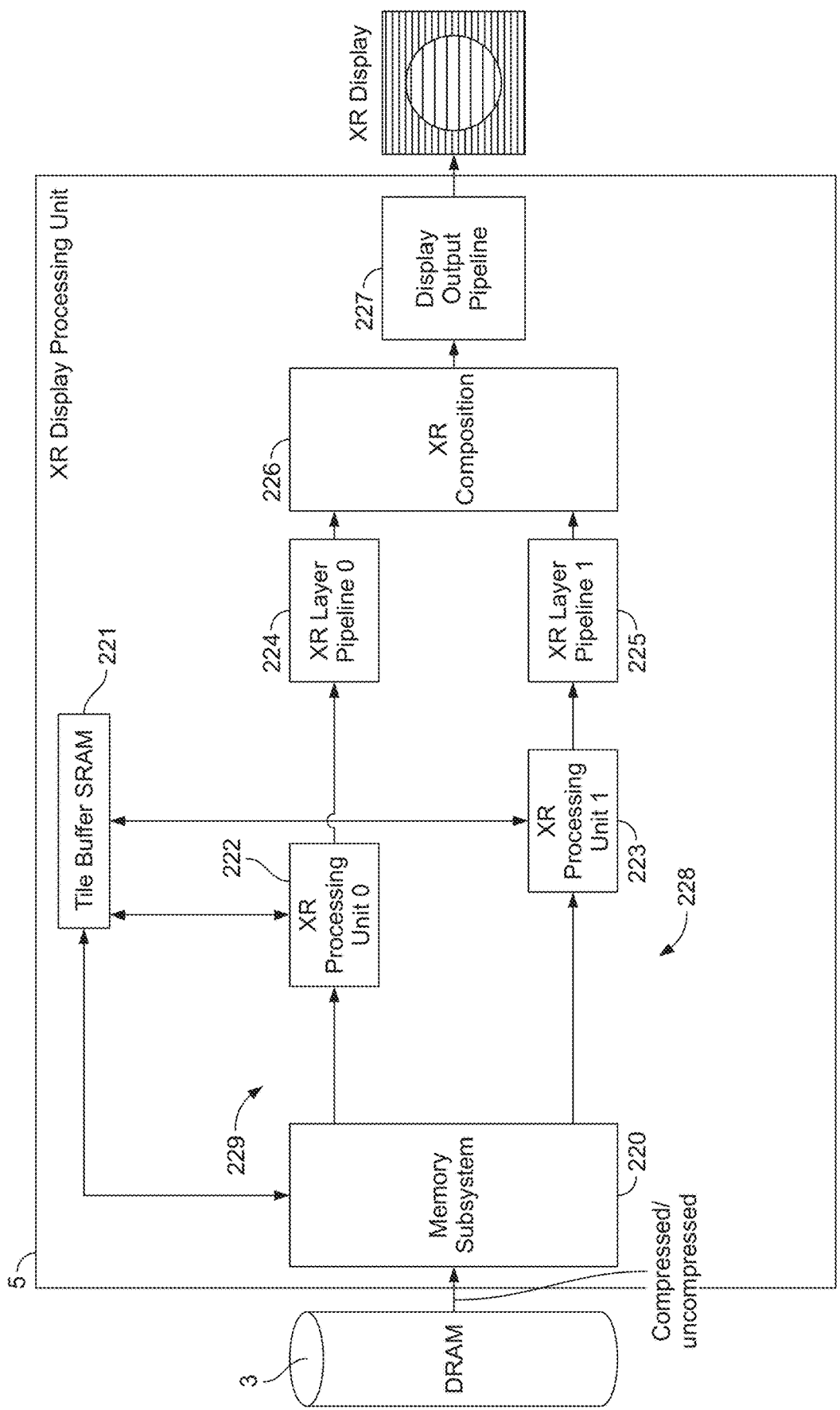
FIG. 7 shows schematically the relevant elements of a display processor in embodiments of the technology described herein.

FIG. 7 shows schematically the relevant elements of the display processor 5 in the embodiments of the technology described herein.

As shown in FIG. 7, the display processor 5 includes an input stage in the form of a memory subsystem 220 that is operable to load data of, inter alia, the different resolution versions of the input frames that have been generated by the graphics processor 2 from the memory 3 into a local buffer 221 of the display processor 5. In the present embodiments, this data is loaded as respective regions (tiles/blocks) of the different resolution versions of the input frame.

As shown in FIG. 7, the display processor then includes one or more (and in this example two) display processing pipelines 228, 229, each of which respectively comprises an XR processing unit 222, 223, and an XR layer pipeline 224, 225. The outputs from these display processing pipelines can then be combined in a composition unit 226 and provided to a display output pipeline 227 for transmission to the display.

The composition unit (display compositor) 226 operates to compose frames generated by the display processing pipelines to generate a composited output frame for display, e.g. by appropriate alpha blending operations, etc. (if required).

The display output pipeline 227 is configured to selectively carry out any desired processing operation(s) on the output surface (frame), and to then transmit the (processed) output frame for appropriate display on the associated display.

The display output pipeline 227 may, for example, comprise a colour conversion stage operable to apply a colour conversion to the output frame, a dithering stage operable to apply dithering to the output frame, and/or a gamma correction stage operable to carry out gamma correction on the output frame. The display output pipeline 227 also comprises appropriate display timing functionality.

The display output pipeline 227 may, e.g., interface with a local display of the data processing system (e.g. of the mobile device, smart phone, tablet, etc., that the data processing system is part of), and/or with an external or remote display.

(The display output pipeline 227 accordingly acts as an output stage for the display processor 5 for providing output frames for display to the display 4.)

The XR layer pipelines 224, 225 perform colour management and colour correction function before the composition stage.

The XR processing units 222, 223 of each display processing pipeline are, inter alia, operable to generate view orientation transformed output frames from input frames generated by the graphics processor 2 that are stored in the memory 3.

Figure 8:
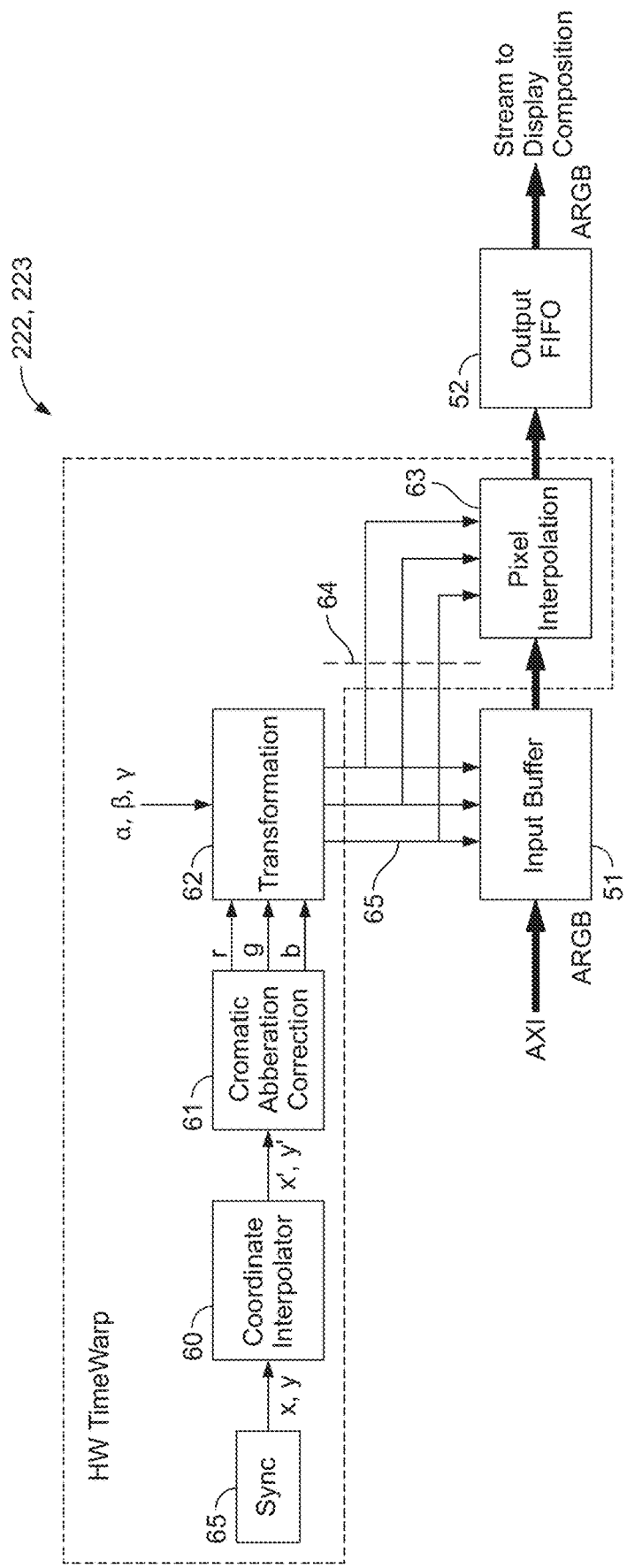
FIG. 8 shows the view orientation transformation operation of a display processor of FIG. 7 in more detail.
Figure 9:
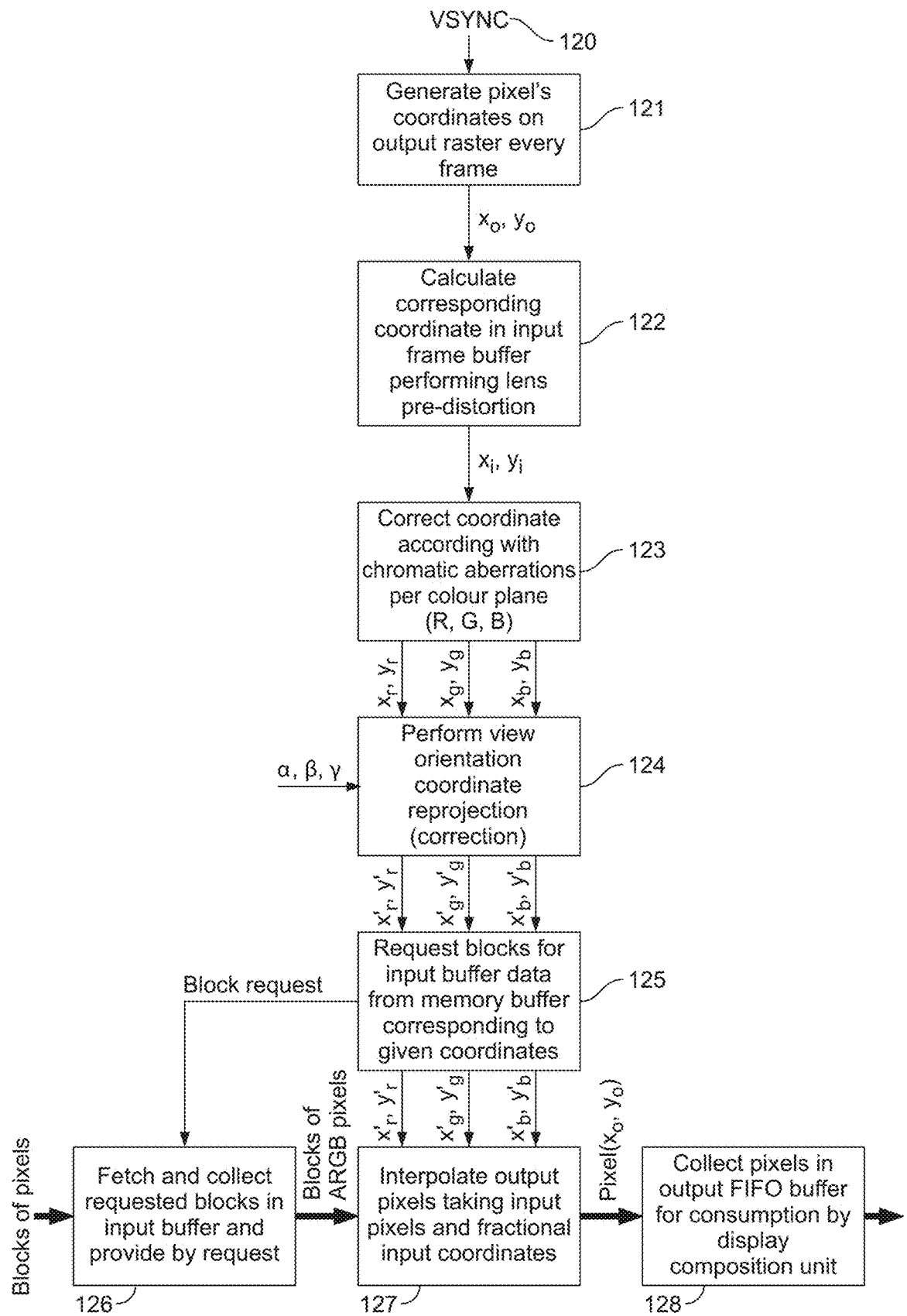
FIG. 9 is a flowchart showing the view orientation transformation operation of the display processor of FIG. 7 in more detail.

FIGS. 8 and 9 show this operation of the XR processing units 222, 223 in more detail.

FIG. 8 shows the XR processing unit in more detail. Each XR processing unit of the display processor is configured and operates in this way.

As shown in FIG. 8, the XR processing unit 222, 223 of the display processor comprises a number of stages, namely a coordinate interpolator stage 60, a chromatic aberration correction stage 61, a view orientation transformation stage 62, and an interpolation stage 63. Each of these stages is in the present embodiments implemented in the form of a fixed-function hardware module (processing circuitry/circuit) that is configured to perform a particular processing operation on the input data that it receives, but also has some limited configurability by virtue of the ability to vary certain control parameters for each module. The control parameters are in the present embodiment set by the driver 209 for the display processor 5 when a sequence of frames is to be displayed, based on the particular headset (display) 4 that the system is being used with.

Other arrangements would, of course, be possible.

The coordinate interpolator stage 60 operates to determine for a sampling position x, y in the output transformed surface that is to be output from the XR processing unit, a corresponding position (coordinate) x', y' in the input frame (in the frame rendered by the GPU 2 that is stored in the memory 3 that is to be displayed to the user) based on a defined lens distortion that corresponds to the lens distortion that will be introduced to the output transformed frame when displayed on the display panel of the display 4 and viewed through the lenses of the head-mounted display.

The coordinate interpolator stage 60 may, for example, execute some form of cubic curve or ellipsoid function for this purpose with, e.g., parameters of that function, such as the focal points of the ellipsoid, being settable by means of control parameters by the driver for the display processor.

Alternatively, three separate distortion meshes that map output coordinates to input coordinates of each of the colour channels could be used for this. For example, a small mesh (32×32) could be used, with the values in between being interpolated using b-spline interpolation. It would also be possible to use bilinear interpolation to interpolate intermediate coordinate values, if desired.

The chromatic aberration correction stage 61, takes the input surface position (coordinates) x', y' determined by the coordinate interpolator stage 60 and "corrects" those coordinates to take account of chromatic aberrations that will be introduced by the lenses of the head-mounted display 4.

As shown in FIG. 8, a separate chromatic aberration correction is performed for each colour plane (R, G, B).

The output of this chromatic aberration correction stage 61 is accordingly three sets of modified input frame positions (coordinates), one set $x_R'$, $y_R'$ for use for sampling the red colour plane in the input frame, one set $x_G'$, $y_G'$ for sampling the green plane in the input frame, and one set $x_B'$, $y_B'$ for sampling the blue plane in the input frame.

In another embodiment, rather than having separate coordinate interpolator 60 and chromatic aberration correction 61 stages, three separate "coordinate interpolator" stages (blocks), one for each colour channel, that also take account of chromatic aberration, could be used to generate the R, G and B colour plane coordinates separately. In this case, rather than having a separate chromatic aberration correction stage 61, the process would simply use three separate coordinate interpolators, one for each colour channel, to generate the appropriate R, G and B coordinates (taking account of chromatic aberration).

The modified input frame positions determined by the chromatic aberration correction stage 61 (or otherwise) are then provided to the view orientation transformation stage 62.

This stage takes as its input a set of transformation parameters that correspond to a predicted view orientation that the input frame is to be rendered as if viewed from for display on the display 4, and operates to generate a projection of the input frame based on (that corresponds to) the predicted view orientation.

The view orientation transformation stage 62 accordingly performs a further transformation on each input frame position provided by the chromatic aberration correction stage to thereby provide a set of view orientation transformed input frame positions ($x_R''$, $y_R''$), ($x_G''$, $y_G''$), ($x_B''$, $y_B''$) which will then be used to sample the input frame to derive the colour values to be used for the output transformed frame sampling (data element) position x, y, that is currently being generated.

The transformation that the view orientation transformation stage 62 performs on each input frame position may comprise, for example, a 3D rotation of the 2D plane (image) (a perspective transform/a 2D homography). Again, this can be adjusted in use by the driver setting control parameters for the transformation stage 62 appropriately.

The transformed input frame positions determined by the view orientation transformation stage 62 are provided to an interpolation stage 63, which samples the input frame at the indicated positions to determine the input frame values at those respective input frame positions. This is done by appropriate interpolation of the input frame values for defined input frame sampling (data element) positions.

The interpolation of the input frame sampling position data can be performed in any suitable and desired way. How this is done in the present embodiments will be discussed in more detail below.

As different input frame positions (coordinates) are determined for the different colour planes, in the present embodiments a separate set of data is accordingly interpolated for the output transformed frame sampling position (data element) for each colour plane (based on the determined input frame position for that colour plane). Thus, the set of RGB colour data for an output transformed frame sampling position (data element) will comprise a red value determined from the determined "red" input frame position (coordinate) ($x_R''$, $y_R''$), a green value determined from the determined "green" input frame position (coordinate) ($x_G''$, $y_G''$), and a blue value determined from the determined "blue" input frame position (coordinate) ($x_B$", $y_B$").

Where an alpha (transparency) value is also to be determined, then that is determined separately for each colour plane, using the respective input frame position (coordinate) that is determined for the colour plane in question.

The interpolated values are then output to the output buffer (FIFO) 52 as shown in FIG. 8, for provision to the remainder of the display processor's display processing pipeline for provision to the display 4 for display to the user.

As shown in FIG. 8, in order that the appropriate input frame data is available for the interpolation stage 63, the modified input surface positions that are determined by the view orientation transformation stage 62 (and that are to be sampled by the interpolation stage 63) are used 65 to control the fetching of the appropriate regions of the input frame containing those sampling positions into the input buffer 51 prior to them being used by the interpolation stage 63.

To do this, the integer parts of the input frame positions determined by the view orientation transformation stage 62 are used to identify the appropriate two-dimensional blocks of the input frame that contain the required input frame data. The input stage then operates to load those respective input frame blocks into the input buffer 51.

As also shown in FIG. 8, to allow for latency between requesting input frame data into the input buffer 51 for use by the interpolation stage 63 and the interpolation stage 63 processing that data to provide an output transformed frame sampling position, there may be an appropriate delay (latency-absorbing) mechanism 64 included in the transformation stage. This can be implemented as desired.

As shown in FIG. 8, the operation of the XR processing unit is triggered, and its timing controlled, by receipt of appropriate synchronisation signals 65 from the display 4.

FIG. 9 is a flowchart showing the operation of the XR processing unit as shown in FIG. 8.

FIG. 9 shows the operation for a respective pixel (data) position in the output transformed frame that is to be generated for display. This operation is repeated for each output transformed frame pixel (data position) that is required.

As shown in FIG. 9, the process starts with an appropriate synchronisation signal 120 indicating the start of a new output frame for display.

The desired output transformed frame pixel coordinates to be generated next, $x_0$, $y_0$, are then determined (step 121).

The coordinate interpolator stage 60 then operates to determine for the pixel (sampling) position $x_0$, $y_0$, in the output transformed frame that is to be output from the transformation engine, a corresponding position (coordinate) $x_1$, $y_1$ in the input frame (in the frame rendered by the GPU 2 that is stored in the memory 3 that is to be displayed to the user) based on a defined lens distortion that corresponds to the lens distortion that will be introduced to the output transformed frame when displayed on the display panel of the display 4 and viewed through the lenses of the head-mounted display (step 122).

The chromatic aberration correction stage 61 then takes the input frame position (coordinates) $x_1$, $y_1$ determined by the coordinate interpolator stage 60 at step 122 and "corrects" those coordinates to take account of chromatic aberrations that will be introduced by the lenses of the display 4 (step 123), to provide the three sets of modified input frame positions (coordinates) $x_r$, $y_r$; $x_{ga}$, $y_{ga}$; $x_b$, $y_b$.

As discussed above, the lens pre-distortion at step 123 and the chromatic aberration correction at step 123 could be performed as a single operation that calculates the corresponding coordinates for each respective colour plane taking account of lens distortion, including chromatic aberration.

The modified input frame positions determined by the chromatic aberration correction stage 61 at step 123 (or otherwise) are then subjected to the "view orientation" coordinate reprojection (correction) by the transformation stage 62 based on the current input set of parameters corresponding to the desired predicted view orientation (step 124) to thereby provide a set of predicted view orientation transformed input frame positions ($x'_r$, $y'_r$), ($x'_{ga}$, $y'_{ga}$), ($x'_b$, $y'_b$).

In an embodiment, the determined lens pre-distorted coordinates are normalised and in the range between −1 to +1, and the view orientation coordinate re-projection (correction) is followed by a "coordinate denormalisation" process that maps the normalised determined lens pre-distorted coordinates to the desired input frame positions (pixel) coordinates.

The so-determined input frame positions are then used, as shown in FIG. 9, to request the fetching of appropriate blocks of the input frame that include the necessary input frame sampling position data into the input buffer to allow the data values for the determined input frame positions to be determined by the interpolation stage 63. This uses the integer part of each determined input frame position to identify which input frame blocks will be required. The identified input frame blocks are then fetched and stored in the input buffer (step 126).

The interpolation stage then reads the appropriate input frame data positions from the input frame blocks stored in the input buffer and interpolates the appropriate data values for the output frame pixel (sampling position) ($x_0$, $y_0$) in question (step 127).

The so-generated output pixels are then collected in the output buffer for subsequent provision to (and consumption by) the display composition unit and provision to the display for display (step 128).

As shown in FIGS. 8 and 9, the XR processing unit of the display processor 5 generates the output transformed frame to be displayed to the user as a sequence of sampling positions (pixels) in that output transformed frame (on a sampling position-by-sampling position) (pixel-by-pixel) basis. In the present embodiments, the transformation engine is configured to generate the output transformed frame raster line-by-raster line (e.g. as that is the order in which that output transformed frame will be needed to be provided to the display 4 for display).

FIGS. 8 and 9 primarily illustrate the operation of the XR processing units when sampling from a given version of a frame to be displayed generated by the graphics processor. When performing foveated display in the manner of the present embodiments, the above operation is used to sample appropriately from one or more of the different resolution versions of the frame that have been generated by the graphics processor. Embodiments of this operation will now be discussed in more detail with reference to FIGS. 10, 11 and 12.

Figure 10:
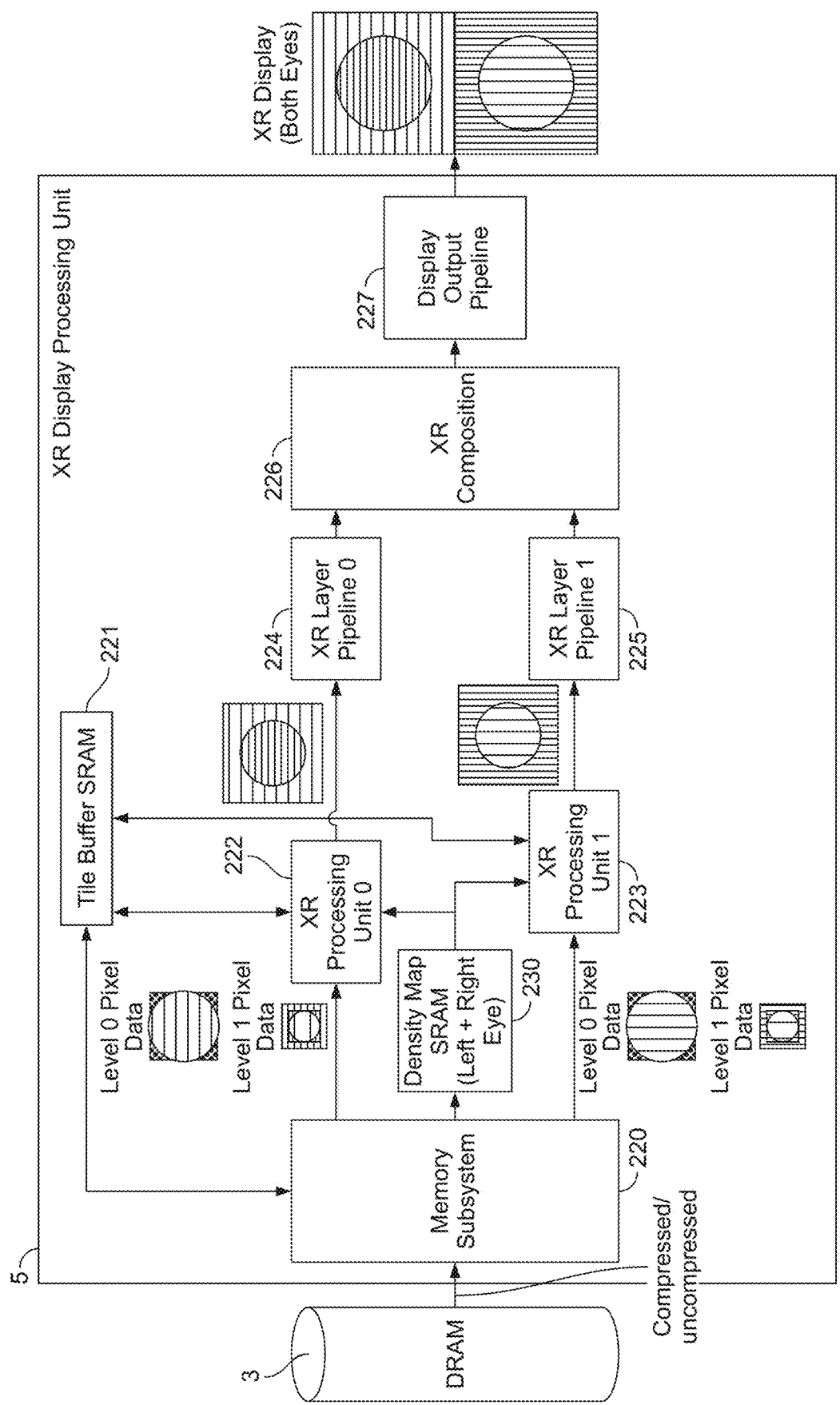
FIG. 10 shows the generation of foveated images for display in embodiments of the technology described herein.

FIG. 10 shows a first embodiment of the operation of the display processor 5 as illustrated in FIG. 7 when generating foveated images for display in the manner of the technology described herein.

As shown in FIG. 10, in this arrangement, it is assumed that each of the XR processing units 222, 223 is able to generate an output view orientation transformed frame from plural different resolution versions of the input frame (FIG. 10 shows two mipmap levels being used).

Thus, as shown in FIG. 10, in this case, each respective display processing pipeline could be used to generate an output image for a different eye. Alternatively, in this arrangement, one of the display processing pipelines could be active and generating an output frame (image), with the other display processing pipeline being left idle. The second display processing pipeline could also, if desired, be used to process another output frame that is then composited with the output frame generated by the first display processing pipeline.

As shown in FIG. 10, the XR processing units 222, 223 take as an input, as well as the (appropriate) data from the plural different resolution versions of the image to be displayed, the appropriate density map/texture 230 indicating which resolution versions of the frame to use where for the output frame that is to be displayed.

Thus, the XR processing units not only determine a set of input frame positions to be sampled to provide the data values for a data element (sampling position) in the output view orientation transformed frame (in the manner discussed above), but also use the density map 230 indicative of which resolution version of the frame generated by the graphics processor is to be used for respective regions of the view orientation transformed output version of the frame being generated to determine which version or versions of the plural different resolution versions of the frame generated by the graphics processor to sample the data from at that set of input frame positions.

In this embodiment, the XR processing unit will determine a set of input frame positions to be sampled to provide the data values for a data element (sampling position) in the output view orientation transformed frame (in the manner discussed above), and use those positions to determine and trigger the fetching of the relevant region(s) of the density map 230 into local storage of the display processor. The fetched density map region(s) may then, e.g., be upscaled, before then being used to determine which version or versions of the plural different resolution versions of the frame to sample for the output frame data element in question.

The relevant regions of the determined different resolution input versions of the input frame will then be fetched by the memory subsystem 220 based on the density map information.

The transformation stage will then sample the so-fetched different resolution version or versions of the input frame at the determined positions to provide the output view orientation transformed data element (pixel) in question.

In one embodiment of this arrangement, the density map 230 provided to the display processor always indicates only a single resolution version (mipmap level) to use for any given region of the output frame. In this case, when performing the view orientation transformations, the XR processing units 222, 223 will accordingly use the density map to determine which resolution version (mipmap level) of the input frame to sample from for a (and each) respective view orientation transformed output frame data element (pixel). The transformation stage will then sample that single determined resolution version of the frame in an appropriate manner, such as, and in an embodiment, using bilinear filtering.

In this case any lower resolution versions of the frame are upscaled to match the highest resolution version (mipmap level) of the frame that is being used, before being sampled by the XR processing unit 222 to provide the relevant output frame data element (pixel). This will facilitate generating the view orientation transformed output frame at the appropriate resolution.

If required, pre-blending of the different resolution versions (mipmap layers) to allow for borders (transitions) between the different resolution versions in the view orientation transformed output frame can be performed on the graphics processor 2, before the different view resolution versions of the input frames are provided to the display processor 5.

In another embodiment, the density map 230 can indicate that more than one different resolution version of a frame (mipmap level) is to be used to generate a given view orientation transformed output frame position (pixel). For example, the density map could indicate the different resolution versions (mipmap levels) to use as fractional values and/or in terms of a gradient.

In this case, the density map for a given view orientation transformed output frame position will be checked to determine the number of different resolution versions (mipmap levels) to sample from for that view orientation transformed frame position (pixel) and the, e.g., gradient factor, to be applied. The memory subsystem 220 will then be controlled to fetch tiles of the appropriate different resolution version(s) (mipmap level(s)) required into the local buffer 221 for processing.

The transformation stage will then sample from the plural different resolution versions of the frame in an appropriate manner, such as, and in an embodiment, using trilinear filtering.

In this case, if the different resolution versions are generated appropriately (e.g. such that they overlap in any border regions), then when sampling from two different resolution versions (two mipmap levels), tri-linear filtering (interpolation) can be used to do that directly, without the need for any pre-blending of the different resolution versions (mipmap levels) by the graphics processor 2. Other arrangements, such as appropriately upscaling any lower resolution versions of the image before performing the sampling interpolation could be used, if desired.

In these embodiments, the sampling (and filtering) process when generating the data elements in the view orientation transformed output frame may also take account of, and act to smooth, the transitions between regions of the output frame that will be generated using different resolution (or at least different highest resolution) versions of the input frame. This may be done in any suitable and desired manner.

The (pixels for) the view orientation transformed output frame generated by the appropriate XR processing unit will then be processed (in the normal manner) by the layer pipeline 224, and then, if required, composited with any other output frames in the composition unit 226, before being provided via the display output pipeline 227 to the display for display (and so on, for each frame to be displayed).

Figure 11:
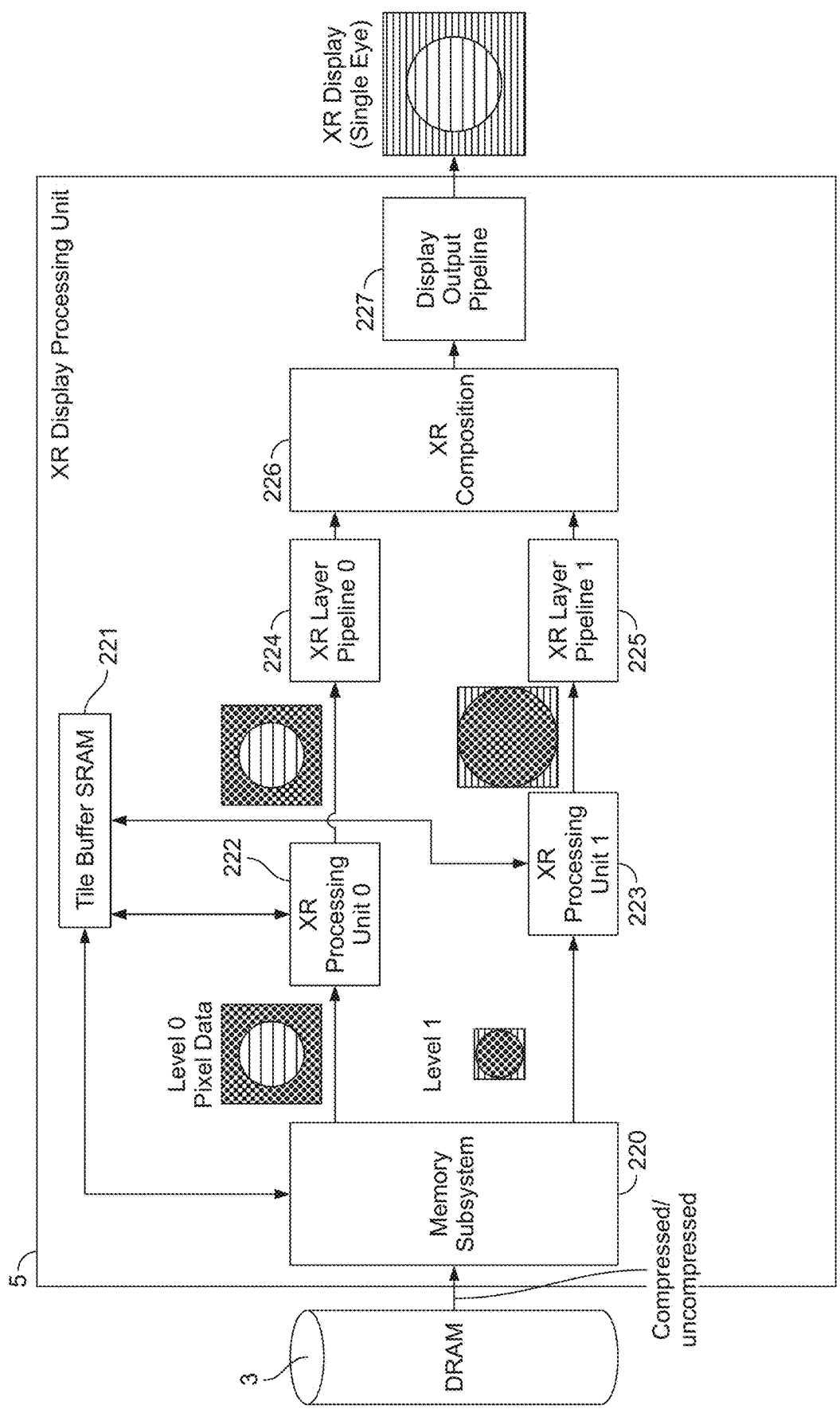
FIG. 11 shows the generation of foveated images for display in another embodiment of the technology described herein.

FIG. 11 shows an alternative embodiment to the embodiments shown in FIG. 10. In this embodiment, as shown in FIG. 11, each respective different resolution version of the frame to be displayed is view orientation transformed by a different one of the display processing pipelines (XP processing units) of the display processor 5. The so-view orientation transformed frames are then combined in the composition unit 226 in accordance with transparency (alpha) values for the different output frame positions to then provide the overall, foveated, view orientation transformed frame for display.

Thus, in this case, as shown in FIG. 11, the XR processing unit 222 of the first display processing pipeline will process highest resolution version of the frame to be displayed (mipmap level 0), and the second XR processing unit 223 of the second display processing pipeline will view orientation transform the lower resolution version of the frame to be displayed (mipmap level 1).

In the latter case, as shown in FIG. 11, the XR processor unit 223 will also operate to upscale the lower resolution version of the frame (mipmap level 1) when generating the view orientation transformed version of that frame to match the resolution of the highest resolution version of the input frame. This then facilitates blending the two different resolution versions of the frame in the composition unit 226.

In this embodiment, rather than providing the density map 230 to the display processor 5 as in the embodiments shown in FIG. 10, the information indicating which different resolution version of the input frame is to be used for respective regions of the output frame is provided in the form of a set of alpha (transparency) values that are associated with the different data elements (pixels) in the different resolution versions of the input frame that are generated by the graphics processor 2. The transparency values are then used to control the blending of the view orientation transformed different resolution versions of the input frame in the composition unit 226 before the overall combined (composited) view orientation transformed output frame is provided via the display output pipeline 227 to the display for display (and so on, for each frame to be displayed).

In this embodiment, the density textures (density maps) 230 provided to the graphics processor 2 are converted to the required alpha (transparency) values for the data elements (pixels) in the different resolution versions of the frame to be displayed that are generated by the graphics processor using a separate processing pass on the graphics processor 2, so as to generate the required transparency (alpha) values from the provided density textures, and "insert" those alpha values into the data element (pixel) values of the different resolution versions (mipmap levels) generated by the graphics processor 5.

Other arrangements would, of course, be possible.

Figure 12A:
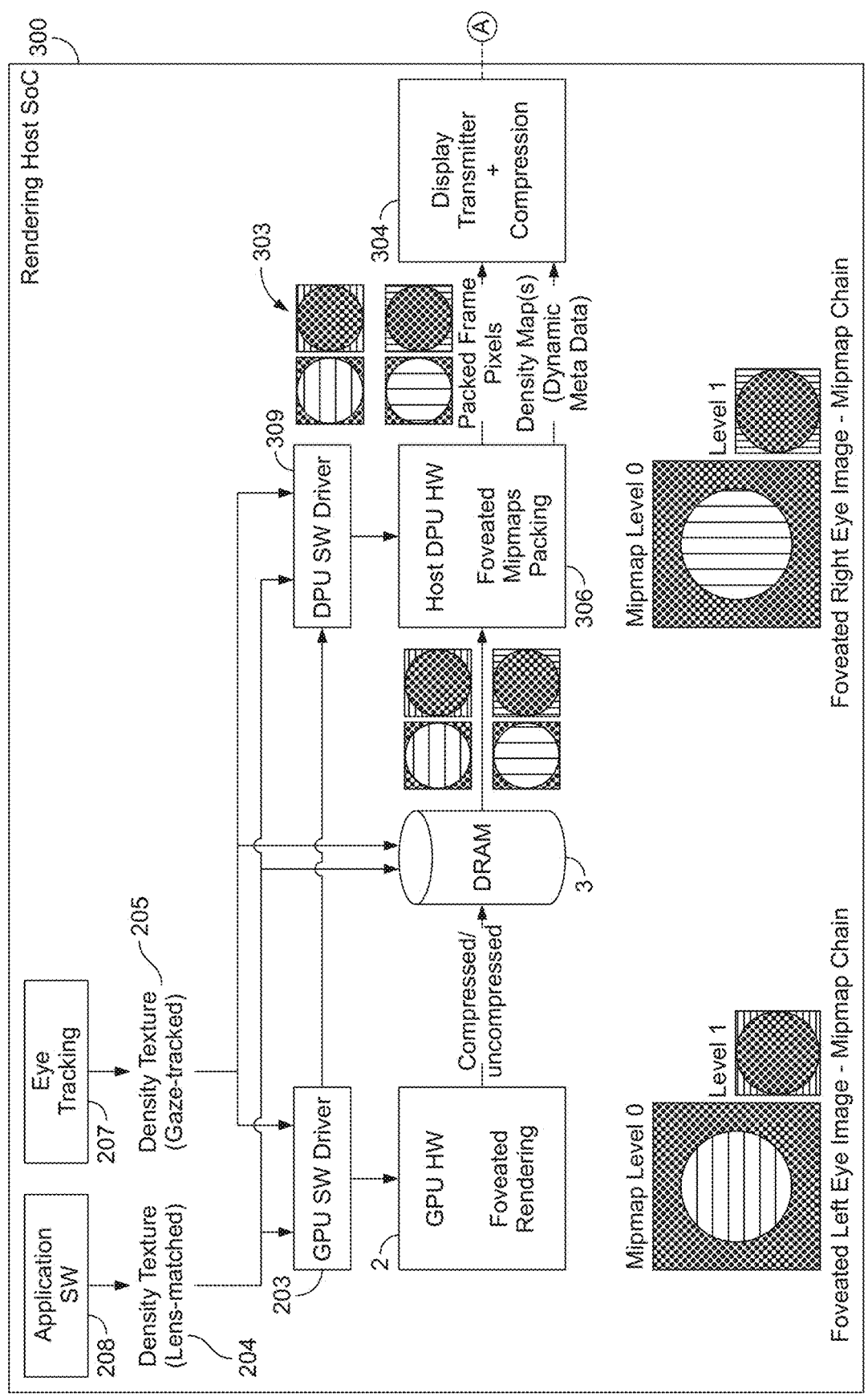
FIGS. 12A and 12B show the generation of foveated images for display in another embodiment of the technology described herein.
Figure 12B:
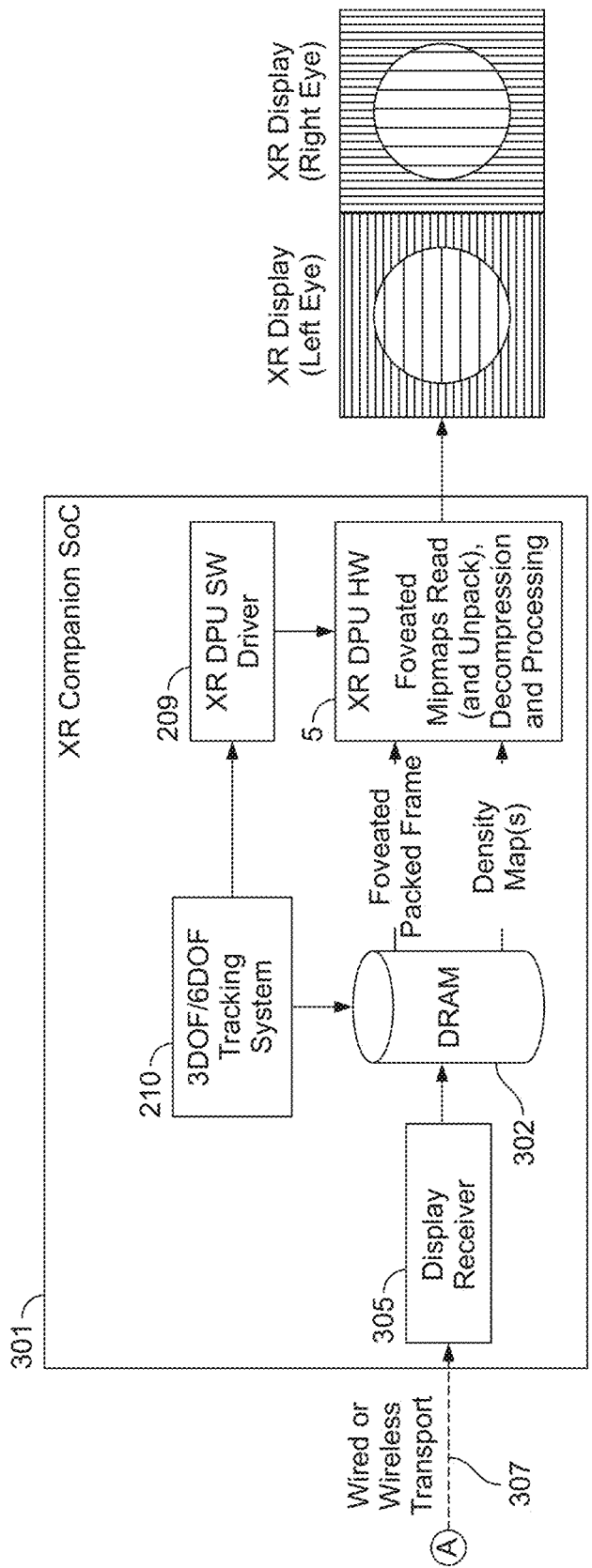

FIG. 12 shows a further embodiment of the technology described herein when implemented in a data processing system that comprises both a host device (system on chip) 300 (which could, for example, be a mobile device, such as a phone, or a PC or a console), that transmits frames (images) for display to a (wired or wireless) companion display device (system on chip) 301 (such as, and in an embodiment, a headset), with the companion display device 301 including the display and also a display processor 5 that is operable to produce view orientation transformed foveated frames for display in the manner of the technology described herein.

In this embodiment an, e.g. graphics processor 2 of the host device 300 will produce the plural different resolution versions of frames to be displayed, but then the display processor operation of the technology described herein is performed on the display processor 5 in the companion display device 301.

As shown in FIG. 12, the host device 300 also includes a display processor 306 that is controlled by an appropriate driver 309. The host device also includes appropriate transmission and compression circuitry (circuit) 304 and is coupled to the companion display device 301 by appropriate wired or wireless transport 307. The companion display device 301 correspondingly includes appropriate receiver circuitry (circuit) 305 and a buffer (memory) 302 for storing data received from the host device 300.

In this embodiment it is necessary to provide the plural different resolution versions of a frame (e.g. set of mipmaps) to the companion device display processor 5 for processing in the manner of the technology described herein.

In this embodiment, this is done by the display processor 306 on the host device 300, as shown in FIG. 12, identifying those parts of the plural different resolution versions of the frame generated by the graphics processor 2 that will be needed by the display processor 5 on the companion display device 301 for generating the output view orientation transformed foveated frame for display, and then packing those parts of the plural different resolution versions generated by the graphics processor 2 into an appropriate frame structure and then transmitting that frame data, together with the appropriate density maps indicating which resolution version of the frame to use where in the output frame, to the companion display device 301.

As shown in FIG. 12, the packed data that is transmitted to the companion display device 301 may also be compressed (and correspondingly decompressed on the companion display device 301), if desired. Any other necessary format changes, conversion or unpacking of the data should also be performed appropriately on the companion device.

In order to do this, the display processor 306 on the host device 300 may use the density maps indicating which resolution versions of the frame generated by the graphics processor 2 are to be used where for the output view orientation transformed frame to identify which regions (tiles) of each different resolution version of the frame will be needed by the display processor 5 in the companion device 301 when generating the output version of the frame for display.

The display processor 306 on the host device 300 may then crop one or more of the different resolution versions of the frame accordingly, such as, as shown in FIG. 12, to remove the non-visible (non-used) part of the highest resolution version of the frame (mipmap level 0), to avoid sending redundant data for a mipmap level (e.g. for the highest resolution version) of the frame.

The display processor 306 on the host device 300 then packs the identified parts of the different resolution versions of the frame into, in this embodiment, a single frame structure, before compressing that single frame structure and transmitting that packed frame structure, together with the density map, to the companion device 301.

In this case, the output frame is in an embodiment divided into a plurality of, in an embodiment regularly sized and shaped, regions, each in an embodiment comprising a rectangular (and in an embodiment square) block of plural data elements (as discussed above), and it is determined for each region in the output frame which resolution version of the frame produced by the producer processing unit will be required, with the host device then transmitting the identified regions of the determined resolution version or versions of the frame to the companion device.

The so-transmitted parts of the different resolution versions of the frame are then stored appropriately in the buffer 302 of the companion device so as to be available then for use by the display processor of the companion device.

The display processor 5 on the companion display device 301 will then, when it is to generate the view orientation transformed foveated output frame for display, fetch the relevant parts of the packed different resolution versions of the frame (mipmaps) from the memory 302 on the companion display device 301, and generate a view orientation transformed foveated frame (image) for display accordingly (e.g. in one of the manners discussed above).

It can be seen from the above that the technology described herein, in its embodiments at least, facilitates generating view orientation transformed foveated images for display. This is achieved in embodiments of the technology described herein at least, by a display processor using data indicative of which resolution version of a frame generated by a producer processing unit is to be used for respective regions of a view orientation transformed output version of a frame to be generated, to generate a view orientation transformed output version of a frame from plural different resolution versions of the frame generated by a producer processing unit.

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a data processing system, the data processing system comprising:
   a processor operable to generate frames for display; and
   a display processor operable to provide frames generated by the processor to a display for display, the display processor comprising:
      an input stage operable to read data of input frames;
      an output stage operable to provide frames for display; and
      at least one transformation stage operable to:
         generate a view orientation transformed output frame using data of an input frame read by the input stage;
   the method comprising:
   the processor generating, for a frame to be displayed, plural different resolution versions of the frame to be displayed as a set of mipmap levels, each mipmap level of the set of mipmap levels comprising a different resolution version of the frame to be displayed, each different resolution version covering an area of the frame to be displayed, wherein at least some of the areas of the different resolution versions overlap in their coverage of the frame;
   providing to the display processor, in addition to the plural different resolution versions of the frame to be displayed, data indicative of which resolution version of the frame generated by the processor is to be used for each of plural respective regions of a view orientation transformed output version of the frame to be generated by the display processor for display, wherein each of the respective regions corresponds to one or more positions of the view orientation transformed output version of the frame, and wherein said data provided to the display processor indicates to the display processor for each of the respective regions whether to use a single resolution version of the frame for the one or more positions of the respective region or to combine plural of the different resolution versions of the frame for the one or more positions of the respective region by blending the plural different resolution versions of the frame at the one or more positions of the respective region using a set of blending parameter values associated with the different resolution versions of the frame;
   wherein the data indicative of which resolution version of the frame generated by the processor is to be used for respective regions of a view orientation transformed output version of the frame to be generated by the display processor for display comprises:
   a two-dimensional array of data element positions representing the area of the output frame to be displayed, with each data element position within the array representing a respective region of the frame to be displayed, the two-dimensional array of data element positions indicating for each data element position which resolution version of the frame to use for each respective region within the frame to be displayed, wherein the two-dimensional array of data element positions comprises for each data element position either:
   (i) in the case that a single one of the different resolution versions of the frame should be used at the respective position represented by the data element position, a data value indicating which single one of the plural different resolution versions of the frame to use for that respective region within the frame to be displayed by the data value indicating which single level of the set of mipmap levels is to be used to provide the resolution version of the frame to be displayed; or
   (ii) in the case that plural different resolution versions of the frame should be combined at the respective region represented by the data element position, a respective data value which indicates which of the plural different resolution versions of the frame to combine for that respective region within the frame to be displayed by the data value indicating which levels of the set of mipmap levels are to be used to provide the plural different resolution versions of the frame to be combined;
   the input stage of the display processor reading data of some or all of the plural different resolution versions of the frame to be displayed generated by the processor;
   the display processor generating a view orientation transformed output version of the frame to be displayed using data from the plural different resolution versions of the frame to be displayed generated by the processor read by the input stage based on the data indicative of which resolution version of the frame generated by the processor is to be used for respective regions of the view orientation transformed output version of the frame to be displayed;
   and
   the output stage of the display processor providing the view orientation transformed output version of the frame to a display for display.

2. The method of claim 1, wherein the different resolution versions of the frame are each only generated for some but not all of the overall frame.

3. The method of claim 1, wherein:
   the display processor generates the view orientation transformed output version of the frame to be displayed using data from the plural different resolution versions of the frame based on the data indicative of which resolution version of the frame is to be used for respective regions of the output version of the frame by:
   for each of plural different resolution versions of the frame generated by the processor, generating a respective view orientation transformed version of that resolution version of the frame to be displayed; and combining the plural view orientation transformed versions of the plural different resolution versions of the frame based on the data indicative of which resolution version of the frame is to be used for respective regions of the view orientation transformed output version of the frame to be displayed, to provide a view orientation transformed output version of the frame for display that comprises a combination of the view orientation transformed versions of the plural different resolution versions of the frame.

4. The method of claim 1, wherein:
the display processor generates the view orientation transformed output version of the frame to be displayed using data from the plural different resolution versions of the frame based on the data indicative of which resolution version of the frame is to be used for respective regions of the output version of the frame by:
a transformation stage of the display processor generating a view orientation transformed output frame for display from a combination of plural different resolution versions of the frame generated by the processor based on the data indicating which resolution version to use for which regions of the output frame.

5. The method of claim 4, wherein:
the display processor generates the view orientation transformed output version of the frame to be displayed using data from the plural different resolution versions of the frame based on the data indicative of which resolution version of the frame is to be used for respective regions of the output version of the frame by:
a transformation stage of the display processor, for each of plural data elements in the view orientation transformed output version of the frame being generated:
determining a set of one or more input frame positions to be sampled to provide the data values for the data element in the output view orientation transformed frame;
using the data indicative of which resolution version of the frame generated by the processor is to be used for respective regions of the view orientation transformed output version of the frame being generated to determine which version or versions of the plural different resolution versions of the frame generated by the processor to sample at the determined set of one or more input frame positions; and
then sampling the so-determined different resolution version or versions of the input frame at the determined positions to provide the data values of the output view orientation transformed frame data element.

6. The method of claim 1, wherein the processor is part of a host device and the display processor is part of a companion device that is in communication with the host device;
and the method comprises:
the host device:
determining the parts of the plural different resolution versions of a frame to be displayed generated by the processor that will be required by the display processor on the companion device when using the plural different resolution versions of the frame to generate an output frame for display; and
transmitting only the determined parts of the different resolution versions of the frame that have been generated to the companion device for use by the display processor on the companion device;
and
the display processor on the companion device:
generating a view orientation transformed output version of the frame to be displayed using data from the plural different resolution versions of the frame to be displayed generated by the processor transmitted to the companion device by the host device.

7. The method of claim 6, wherein the host device also transmits the data indicative of which resolution version of the frame generated by the processor is to be used for respective regions of a view orientation transformed output version of the frame to be generated by the display processor for display to the companion device for use by the display processor on the companion device.

8. The method of claim 6, wherein the host device determines the parts of the plural different resolution versions of a frame to be displayed generated by the processor that will be required by the display processor on the companion device when using the plural different resolution versions of the frame to generate an output frame for display using data indicative of which resolution version of the frame generated by the processor is to be used for respective regions of a view orientation transformed output version of the frame to be generated by the display processor on the companion device for display.

9. The method of claim 1, wherein the display processor, when generating a view orientation transformed output version of the frame based on the data indicative of which resolution version of the frame generated by the processor is to be used for respective regions of the view orientation transformed output version of the frame to be displayed, performs processing to smooth transitions between adjacent regions of the view orientation transformed output version of the frame when adjacent regions are generated using different resolution versions of the frame.

10. The method of claim 1, wherein the set of blending parameter values associated with the different resolution versions of the frame comprises transparency values that are associated with the plural different resolution versions of the frame.

11. The method of claim 1, wherein in the case that a single one of the different resolution versions of the frame should be used at the respective region within the output frame the data value indicating which of the plural different resolution versions of the frame to use for that respective region within the output frame is an integer value that indicates which single one of the different resolution versions of the frame are to be used at the respective region within the output frame; and
wherein in the case that plural different resolution versions of the frame should be combined at the respective region of the output frame, the data value indicating which plural different resolution versions of the frame to combine for that respective region within the output frame is a non-integer value that indicates which plural different resolution versions are to be combined for the respective region of the output frame.

12. A data processing system comprising:
a processor operable to generate frames for display; and
a display processor operable to provide frames generated by the processor to a display for display, the display processor comprising:
an input stage operable to read data of input frames;
an output stage operable to provide frames for display; and at least one transformation stage operable to:
generate a view orientation transformed output frame using data of an input frame read by the input stage;
wherein:
the processor is configured to generate, for a frame to be displayed, plural different resolution versions of the frame to be displayed as a set of mipmap levels, each mipmap level of the set of mipmap levels comprising a different resolution version of the frame to be displayed, each different resolution version covering an area of the frame to be displayed, wherein at least some of the areas of the different resolution versions overlap in their coverage of the frame;
the input stage of the display processor is configured to read data of some or all of the plural different resolution versions of the frame to be displayed generated by the processor;
the display processor is configured to generate a view orientation transformed output version of a frame to be displayed using data from plural different resolution versions of the frame to be displayed generated by the processor read by the input stage based on data indicative of which resolution version of the frame generated by the processor is to be used for each of plural respective regions of a view orientation transformed output version of the frame to be displayed to be generated by the display processor for display provided to the display processor in addition to the plural different resolution versions of the frame to be displayed, wherein each of the respective regions comprises one or more positions of the view transformed output version of the frame to be generated, and wherein said data indicative of which resolution version of the frame generated by the processor is to be used for each of the respective regions of the view orientation transformed output version of the frame indicates for each of the respective regions whether the display processor is to use a single resolution version of the frame for the one or more positions of the respective region or to combine plural of the different resolution versions of the frame for the one or more positions of the respective region by blending the plural different resolution versions of the frame at the one or more positions of the respective region using a set of blending parameter values associated with the different resolution versions of the frame;
wherein the data indicative of which resolution version of the frame generated by the processor is to be used for respective regions of a view orientation transformed output version of the frame to be generated by the display processor for display comprises:
a two-dimensional array of data element positions representing the area of the output frame to be displayed, with each data element position within the array representing a respective region of the frame to be displayed, the two-dimensional array of data elements indicating for each data element position which resolution version of the frame to use for each respective region within the frame to be displayed, wherein the two-dimensional array of data element positions comprises for each data element position either:
(i) in the case that a single one of the different resolution versions of the frame should be used at the respective position represented by the data element position, a data value indicating which single one of the plural different resolution versions of the frame to use for that respective region within the frame to be displayed by the data value indicating which single level of the set of mipmap levels is to be used to provide the resolution version of the frame to be displayed; or
(ii) in the case that plural different resolution versions of the frame should be combined at the respective region represented by the data element position, a respective data value which indicates which of the plural different resolution versions of the frame to combine for that respective region within the frame to be displayed by the data value indicating which levels of the set of mipmap levels are to be used to provide the plural different resolution versions of the frame to be combined;
and
the output stage of the display processor is configured to provide the view orientation transformed output version of the frame to a display for display.

13. The system of claim 12, wherein the different resolution versions of the frame are each only generated for some but not all of the overall frame.

14. The system of claim 12, wherein:
the display processor is configured to generate the view orientation transformed output version of the frame to be displayed using data from the plural different resolution versions of the frame based on the data indicative of which resolution version of the frame is to be used for respective regions of the output version of the frame by:
for each of plural different resolution versions of the frame generated by the processor, generating a respective view orientation transformed version of that resolution version of the frame to be displayed; and
combining the plural view orientation transformed versions of the plural different resolution versions of the frame based on the data indicative of which resolution version of the frame is to be used for respective regions of the view orientation transformed output version of the frame to be displayed, to provide a view orientation transformed output version of the frame for display that comprises a combination of the view orientation transformed versions of the plural different resolution versions of the frame.

15. The system of claim 12, wherein:
the display processor is configured to generate the view orientation transformed output version of the frame to be displayed using data from the plural different resolution versions of the frame based on the data indicative of which resolution version of the frame is to be used for respective regions of the output version of the frame by:
a transformation stage of the display processor generating a view orientation transformed output frame for display from a combination of plural different resolution versions of the frame generated by the processor based on the data indicating which resolution version to use for which regions of the output frame.

16. The system of claim 12, wherein the processor is part of a host device and the display processor is part of a companion device that is in communication with the host device;
and the host device is configured to:
determine the parts of the plural different resolution versions of a frame to be displayed generated by the processor that will be required by the display processor on the companion device when using the plural different resolution versions of the frame to generate an output frame for display; and transmit only the determined parts of the different resolution versions of the frame that have been generated to the companion device for use by the display processor on the companion device; and the display processor on the companion device is configured to:

generate a view orientation transformed output version of a frame to be displayed using data from the plural different resolution versions of the frame to be displayed generated by the processor transmitted to the companion device by the host device.

17. A head-mounted display device comprising the data processing system of claim 12.

18. A display processor operable to provide frames to a display for display, the display processor comprising:

an input stage operable to read data of input frames;

an output stage operable to provide frames for display to a display; and at least one transformation stage operable to:

generate a view orientation transformed output frame using data of an input frame read by the input stage;

wherein:

the input stage of the display processor is configured to read data of some or all of plural different resolution versions of a frame to be displayed, each different resolution version covering an area of the frame to be displayed, wherein at least some of the areas of the different resolution versions overlap in their coverage of the frame, wherein the plural different resolution versions of a frame to be displayed are provided as a set of mipmap levels, each mipmap level of the set of mipmap levels comprising a different resolution version of the frame to be displayed;

the display processor is configured to generate a view orientation transformed output version of a frame to be displayed using data from plural different resolution versions of the frame to be displayed read by the input stage based on data indicative of which resolution version of the frame is to be used for each of plural respective regions of a view orientation transformed output version of the frame to be displayed to be generated by the display processor for display provided to the display processor in addition to the plural different resolution versions of the frame to be displayed, wherein each of the respective regions comprises one or more positions of the view transformed output version of the frame to be displayed, and wherein said data indicative of which resolution version of the frame is to be used for each of the respective regions of the view orientation transformed output version of the frame indicates for each of the respective regions whether the display processor is to use a single resolution version of the frame for the one or more positions of the respective region or to combine plural of the different resolution versions of the frame for the one or more positions of the respective region by blending the plural different resolution versions of the frame at the one or more positions of the respective region using a set of blending parameter values associated with the different resolution versions of the frame;

wherein the data indicative of which resolution version is to be used for respective regions of a view orientation transformed output version of the frame to be generated by the display processor for display comprises:

a two-dimensional array of data element positions representing the area of the output frame to be displayed, with each data element position within the array representing a respective region of the frame to be displayed, the two-dimensional array of data elements indicating for each data element position which resolution version of the frame to use for each respective region within the frame to be displayed, wherein the two-dimensional array of data element positions comprises for each data element position either:

(i) in the case that a single one of the different resolution versions of the frame should be used at the respective position represented by the data element position, a data value indicating which single one of the plural different resolution versions of the frame to use for that respective region within the frame to be displayed by the data value indicating which single level of the set of mipmap levels is to be used to provide the resolution version of the frame to be; or (ii) in the case that plural different resolution versions of the frame should be combined at the respective region represented by the data element position, a respective data value which indicates which of the plural different resolution versions of the frame to combine for that region within the frame to be displayed by the data value indicating which levels of the set of mipmap levels are to be used to provide the plural different resolution versions of the frame to be combined; and the output stage of the display processor is configured to provide the view orientation transformed output version of the frame to a display for display.

19. A non-transitory computer readable storage medium comprising computer software code which when executing on a data processor performs a method of operating a data processing system, the data processing system comprising:

a processor operable to generate frames for display; and a display processor operable to provide frames generated by the processor to a display for display, the display processor comprising:

an input stage operable to read data of input frames;

an output stage operable to provide frames for display; and at least one transformation stage operable to:

generate a view orientation transformed output frame using data of an input frame read by the input stage;

the method comprising:

the processor generating, for a frame to be displayed, plural different resolution versions of the frame to be displayed as a set of mipmap levels, each mipmap level of the set of mipmap levels comprising a different resolution version of the frame to be displayed, each different resolution version covering an area of the frame to be displayed, wherein at least some of the areas of the respective different resolution versions overlap in their coverage of the frame;

providing to the display processor, in addition to the plural different resolution versions of the frame to be displayed, data indicative of which resolution version of the frame generated by the processor is to be used for each of plural respective regions of a view orientation transformed output version of the frame to be generated by the display processor for display, wherein each of the respective regions comprises one or more positions of the view transformed output version of the frame, and wherein said data provided to the display processor indicates to the display processor for each of the respective regions whether to use a single resolution version of the frame for the one or more positions of the respective region or to combine plural of the different resolution versions of the frame for the one or more positions of the respective region by blending the plural different resolution versions of the frame at the one or more positions of the respective region using a set of blending parameter values associated with the different resolution versions of the frame;

wherein the data indicative of which resolution version of the frame generated by the processor is to be used for respective regions of a view orientation transformed output version of the frame to be generated by the display processor for display comprises:

a two-dimensional array of data element positions representing the area of the output frame to be displayed, with each data element position within the array representing a respective region of the frame to be displayed, the two-dimensional array of data element positions indicating for each data element position which resolution version of the frame to use for each respective region within the frame to be displayed, wherein the two-dimensional array of data element positions comprises for each data element position either:

(i) in the case that a single one of the different resolution versions of the frame should be used at the respective position represented by the data element position, a data value indicating which single one of the plural different resolution versions of the frame to use for that respective region within the frame to be displayed by the data value indicating which single level of the set of mipmap levels is to be used to provide the resolution version of the frame to be; or (ii) in the case that plural different resolution versions of the frame should be combined at the respective region represented by the data element position, a respective data value which indicates which of the plural different resolution versions of the frame to combine for that respective region within the frame to be displayed by the data value indicating which levels of the set of mipmap levels are to be used to provide the plural different resolution versions of the frame to be combined;

the input stage of the display processor reading data of some or all of the plural different resolution versions of the frame to be displayed generated by the processor;

the display processor generating a view orientation transformed output version of the frame to be displayed using data from the plural different resolution versions of the frame to be displayed generated by the processor read by the input stage based on the data indicative of which resolution version of the frame generated by the processor is to be used for respective regions of the view orientation transformed output version of the frame to be displayed;

and the output stage of the display processor providing the view orientation transformed output version of the frame to the display a display.

\* \* \* \* \*